(12) United States Patent
Chen et al.

(10) Patent No.: US 12,189,099 B2
(45) Date of Patent: Jan. 7, 2025

(54) PHOTOGRAPHING LENS SYSTEM, PHOTOGRAPHING DEVICE AND ELECTRONIC APPARATUS

(71) Applicant: BEIJING XIAOMI MOBILE SOFTWARE CO., LTD., Beijing (CN)

(72) Inventors: Yonghua Chen, Beijing (CN); Zhidong Yin, Beijing (CN); Xue Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 270 days.

(21) Appl. No.: 17/383,210

(22) Filed: Jul. 22, 2021

(65) Prior Publication Data
US 2022/0236540 A1  Jul. 28, 2022

(30) Foreign Application Priority Data

Jan. 22, 2021 (CN) .......................... 202110090853.9

(51) Int. Cl.
*G02B 13/18* (2006.01)
*G02B 9/04* (2006.01)

(52) U.S. Cl.
CPC .............. *G02B 13/18* (2013.01); *G02B 9/04* (2013.01)

(58) Field of Classification Search
CPC . G02B 13/18; G02B 9/04; G02B 7/08; G02B 13/0045; G02B 9/64; G02B 13/0015; G02B 15/1421; G02B 7/04; G02B 13/00
(Continued)

(56) References Cited

U.S. PATENT DOCUMENTS 5,598,299 A    1/1997   Hayakawa
8,917,456 B2 * 12/2014  Ori .......................... G02B 13/18
                                                              359/683
(Continued)

FOREIGN PATENT DOCUMENTS

CN        201666968 U    12/2010
DE     112013004108 T5     5/2015
(Continued)

OTHER PUBLICATIONS

Japanese Patent Application No. 2021-122423, Office Action dated Nov. 8, 2022, 6 pages.
(Continued)

*Primary Examiner* — Thomas K Pham
*Assistant Examiner* — Kuei-Jen L Edenfield
(74) *Attorney, Agent, or Firm* — Cozen O'Connor

(57) ABSTRACT

A photographing lens system, a photographing device and an electronic apparatus are provided. The photographing lens system includes a first lens group and a second lens group in sequence from an object side to an image side. The first lens group includes N lenses, and N is an integer greater than 2. In a direction from the object side to the image side, lens one in the first lens group is a first lens, and lens N in the first lens group is a second lens. The first lens is a lens with a positive focal power, and the second lens is a lens with a focal power. The second lens group includes at least one lens with a focal power. An air gap between the first lens group and the second lens group is changed in the process of focusing between an infinite distance and a closer distance.

18 Claims, 20 Drawing Sheets

(58) Field of Classification Search
USPC ....... 359/682, 683, 684, 692, 693, 793, 794, 359/795
See application file for complete search history.

(56) References Cited

U.S. PATENT DOCUMENTS

| | | | |
|---|---|---|---|
| 2015/0138425 A1 | 5/2015 | Lee et al. | |
| 2015/0168677 A1 | 6/2015 | Lee et al. | |
| 2016/0116715 A1* | 4/2016 | Ota | G02B 13/0045 359/757 |
| 2019/0113721 A1 | 4/2019 | Katayose | |
| 2020/0003991 A1 | 1/2020 | Okada | |
| 2021/0041666 A1* | 2/2021 | Hoshi | G02B 13/0045 |
| 2022/0163778 A1* | 5/2022 | Hirakawa | G02B 13/24 |

FOREIGN PATENT DOCUMENTS

| | | |
|---|---|---|
| EP | 3422069 A1 | 1/2019 |
| JP | H0281015 A | 3/1990 |
| JP | 2004240074 A | 8/2004 |
| JP | 2011227362 A | 11/2011 |
| JP | 2012155223 A | 8/2012 |
| JP | 2012203234 A | 10/2012 |
| JP | 2013178429 A | 9/2013 |
| JP | 2013218015 A | 10/2013 |
| JP | 2015114505 A | 6/2015 |
| JP | 2015129869 A | 7/2015 |
| JP | 2018040858 A | 3/2018 |
| JP | 2018155776 A | 10/2018 |
| JP | 2019074631 A | 5/2019 |
| WO | WO 2013073155 A1 | 5/2013 |
| WO | WO 2014030288 A1 | 2/2014 |
| WO | WO 2014034040 A1 | 3/2014 |
| WO | WO 2020127280 A1 | 6/2020 |

OTHER PUBLICATIONS

Japanese Patent Application No. 2021-122423, English translation of Office Action dated Nov. 8, 2022, 6 pages.
Japanese Patent Application No. 2021-122423, Office Action dated Jul. 12, 2022, 4 pages.
Japanese Patent Application No. 2021-122423, English translation of Office Action dated Jul. 12, 2022, 4 pages.
European Patent Application No. 21188223.8, Search and Opinion dated Jan. 10, 2022, 6 pages.
European Patent Application No. 21188223.8, Office Action dated Aug. 2, 2024, 10 pages.

* cited by examiner (OFFSET)

(OFFSET)

PHOTOGRAPHING LENS SYSTEM, PHOTOGRAPHING DEVICE AND ELECTRONIC APPARATUS

CROSS-REFERENCE TO RELATED APPLICATION

The present disclosure is based upon and claims priority to Chinese Patent Application No. 202110090853.9, filed on Jan. 22, 2021, the entire content of which is incorporated herein by reference.

TECHNICAL FIELD

The present disclosure relates to a photographing lens system, a photographing device and an electronic apparatus, and more particularly to a photographing lens system and a photographing device suitable for an electronic apparatus such as a mobile terminal.

BACKGROUND

In the related art, with a development trend of a camera for an intelligent electronic apparatus towards a high pixel, an image plane of an image sensor becomes larger and larger. Under a size limitation, a ratio of a total track length (TTL) to an effective image circle diameter of the image plane becomes lower and lower, showing a low profile trend. In order to keep a balance between a center field of view and an edge field of view in terms of an optical performance, an aspheric lens with at least one inflection point on a surface is often adopted in a system, and a lens with a large difference in curvature on both sides of the inflection point is often used to improve the petzval, field curve and distortion. However, since an angle difference between an incident light close to the inflection point and a lens surface is large when light of each field of view is focused at an infinite object distance and a close object distance respectively, which leads to an optical path difference of the light of each field of view varying greatly. When an imaging system maintains a good image quality of the imaging at the infinite distance, an aberration of the imaging at the closer distance increases greatly and an image resolution performance has a serious drop.

SUMMARY

According to an aspect of embodiments of the present disclosure, a photographing lens system is provided. The photographing lens system includes a first lens group and a second lens group in sequence from an object side to an image side. The first lens group includes N lenses, and N is an integer greater than 2. In a direction from the object side to the image side, lens one in the first lens group is a first lens, and lens N in the first lens group is a second lens. The first lens is a lens with a positive focal power, and a surface of the first lens facing the object side is a convex surface. The second lens is a lens with a focal power. The second lens group includes at least one lens with a focal power. An air gap between the first lens group and the second lens group is changed in a process of focusing between an infinite distance and a closer distance. A focal length of the first lens group is f1, a focal length of the photographing lens system is f when focused at the infinite distance, and the focal length of the first lens group and the focal length of the photographing lens system when focused at the infinite distance satisfy a following relationship of f1/f: $0.5 < f1/f < 1.5$.

According to another aspect of embodiments of the present disclosure, a photographing device is provided. The photographing device includes an image sensor and a photographing lens system, and the image sensor is arranged at an image plane of the photographing lens system. The photographing lens system includes a first lens group and a second lens group in sequence from an object side to an image side. The first lens group includes N lenses, and N is an integer greater than 2. In a direction from the object side to the image side, lens one in the first lens group is a first lens, and lens N in the first lens group is a second lens. The first lens is a lens with a positive focal power, and a surface of the first lens facing the object side is a convex surface. The second lens is a lens with a focal power. The second lens group includes at least one lens with a focal power. An air gap between the first lens group and the second lens group is changed in a process of focusing between an infinite distance and a closer distance. A focal length of the first lens group is f1, a focal length of the photographing lens system is f when focused at the infinite distance, and the focal length of the first lens group and the focal length of the photographing lens system when focused at the infinite distance satisfy a following relationship of f1/f: $0.5 < f1/f < 1.5$.

According to another aspect of embodiments of the present disclosure, an electronic apparatus is provided. The electronic apparatus includes an apparatus body and a photographing device, and the photographing device is mounted to the apparatus body. The photographing device includes an image sensor and a photographing lens system, and the image sensor is arranged at an image plane of the photographing lens system. The photographing lens system includes a first lens group and a second lens group in sequence from an object side to an image side. The first lens group includes N lenses, and N is an integer greater than 2. In a direction from the object side to the image side, lens one in the first lens group is a first lens, and lens N in the first lens group is a second lens. The first lens is a lens with a positive focal power, and a surface of the first lens facing the object side is a convex surface. The second lens is a lens with a focal power. The second lens group includes at least one lens with a focal power. An air gap between the first lens group and the second lens group is changed in a process of focusing between an infinite distance and a closer distance. A focal length of the first lens group is f1, a focal length of the photographing lens system is f when focused at the infinite distance, and the focal length of the first lens group and the focal length of the photographing lens system when focused at the infinite distance satisfy a following relationship of f1/f: $0.5 < f1/f < 1.5$.

It should be understood that the above general description and the following detailed description are only illustrative and explanatory and cannot be construed as a limitation of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Illustrative embodiments of the present disclosure will be described in details herein, and the examples thereof are illustrated in the accompanying drawings. When the description below concerns the drawings, same numbers in different drawings represent same or similar elements, unless indicated otherwise. In the following illustrative embodiments, the embodiments illustrated do not represent all embodiments consistent with the present disclosure. Instead, they are merely examples of devices and methods consistent with some aspects of the present disclosure as detailed in the appended claims.

Figure 1:
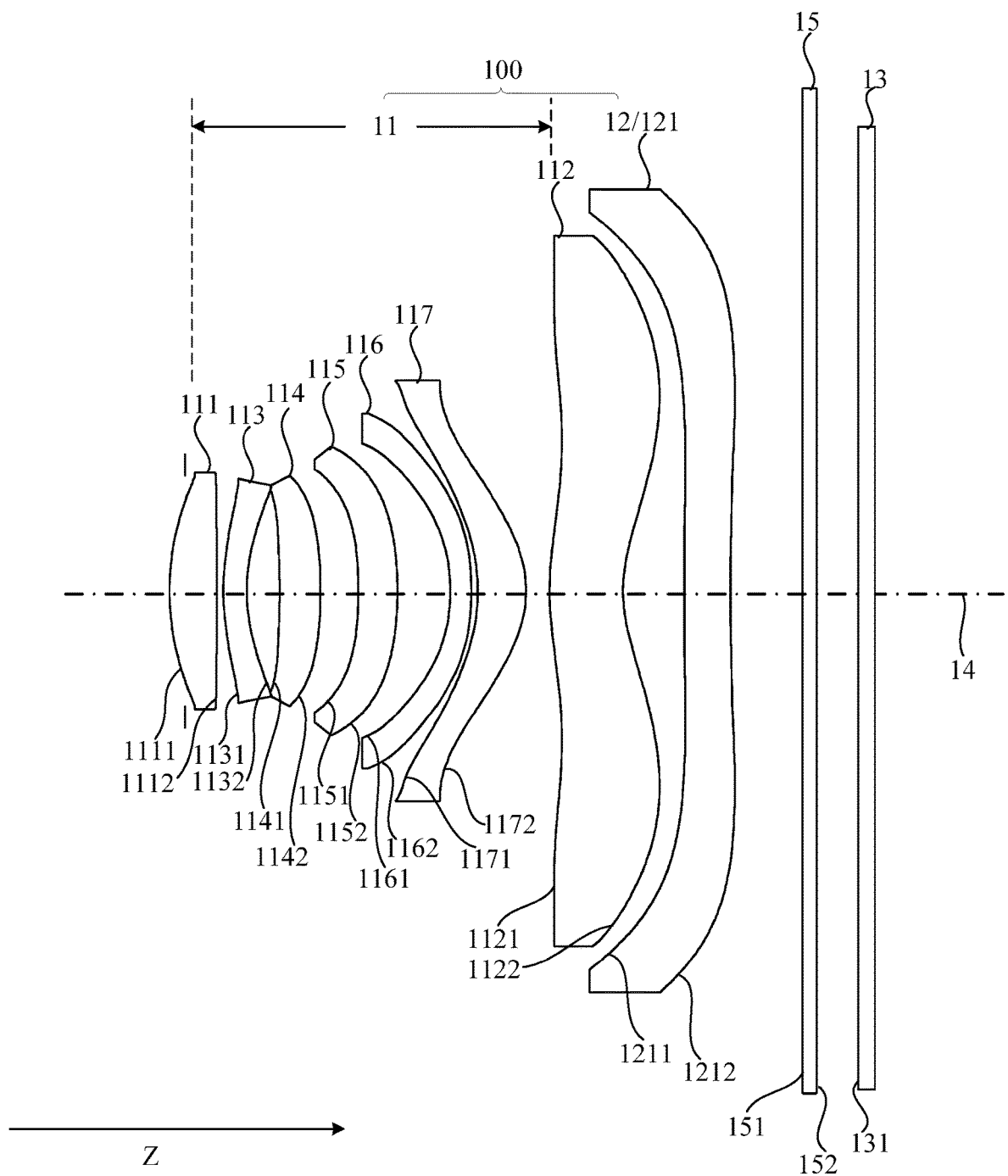
FIG. 1 is a schematic view of a photographing lens system according to an illustrative embodiment of the present disclosure.

FIG. 1 is a schematic view of a photographing lens system 100 according to an illustrative embodiment. As illustrated in FIG. 1, the photographing lens system 100 includes a first lens group 11 and a second lens group 12 in sequence from an object side to an image side.

In this embodiment, as illustrated in FIG. 1, the first lens group 11 includes N lenses, and N is an integer greater than 2. The N lenses include at least two aspheric lenses, i.e., the first lens group 11 includes at least two aspheric lenses. Of course, the N lenses may also include at least two spherical lenses, and are not limited to the aspheric lenses in the embodiment of the present disclosure.

In this embodiment, N may be 7, that is, the first lens group 11 includes seven lenses, namely lenses 111, 112, 113, 114, 115, 116 and 117, respectively.

As illustrated in FIG. 1, in this embodiment, the first lens group 11 includes: a first lens 111, a third lens 113, a fourth lens 114, a fifth lens 115, a sixth lens 116, a seventh lens 117 and a second lens 112 in sequence from the object side to the image side. That is, in a direction Z from the object side to the image side, lens one in the first lens group 11 is the first lens 111, lens two in the first lens group 11 is the third lens 113, lens three in the first lens group 11 is the fourth lens 114, lens four in the first lens group 11 is the fifth lens 115, lens five in the first lens group 11 is the sixth lens 116, lens six in the first lens group 11 is the seventh lens 117, and lens seven in the first lens group 11 is the second lens 112. In the first lens group 11, the first lens 111 has a minimum distance from an object plane (not illustrated), and a maximum distance from an image plane 131.

As illustrated in FIG. 1, in this embodiment, the first lens 111 includes a first surface 1111 facing the object side and a second surface 1112 facing the image side, the third lens 113 includes a third surface 1131 facing the object side and a fourth surface 1132 facing the image side, the fourth lens 114 includes a fifth surface 1141 facing the object side and a sixth surface 1142 facing the image side, the fifth lens 115 includes a seventh surface 1151 facing the object side and an eighth surface 1152 facing the image side, the sixth lens 116 includes a ninth surface 1161 facing the object side and a tenth surface 1162 facing the image side, the seventh lens 117 includes an eleventh surface 1171 facing the object side and a twelfth surface 1172 facing the image side, and the second lens 112 includes a thirteenth surface 1121 facing the object side and a fourteenth surface 1122 facing the image side.

In this embodiment, the first lens 111 is an aspheric lens with a positive focal power, and the first surface 1111 of the first lens 111 facing the object side is a convex surface. The third lens 113 has a negative focal power. The fourth lens 114 has a positive focal power. The fifth lens 115 has a positive focal power. The sixth lens 116 has a negative focal power. The seventh lens 117 has a positive focal power. The second lens 112 is an aspheric lens with a negative focal power.

In this embodiment, a curve equation of aspheric surfaces of the first lens 111 and the second lens 112 is shown as follows:

$$X = \frac{cr^2}{1 + \operatorname{sqrt}(1 - (1+k) \times (cr)^2)} + A3r^3 + A4r^4 + A5r^5 + \cdots + A30r^{30}. \quad (1)$$

X is an concavity of a curved surface parallel to an optical axis 14, c is a curvature at a pole of the curved surface, r is a vertical distance between a point on the aspheric surface and the optical axis 14, k is a conic constant, and A3~A30 are aspheric coefficients.

As illustrated in FIG. 1, in this embodiment, the second lens group 12 includes one eighth lens 121 with a negative focal power. The eighth lens 121 includes a fifteenth surface 1211 facing the object side and a sixteenth surface 1212 facing the image side.

In this embodiment, an air gap between the first lens group 11 and the second lens group 12 changes in a process of focusing between an infinite distance and a closer distance. It should be noted that the infinite distance and the closer distance are defined in terms of an object. That is, the infinite distance and the closer distance may also be referred to as "the infinite object distance" and "the closer object distance", respectively. The air gap is a distance between two adjacent lenses or lens groups on the optical axis. In this embodiment, the first lens group 11 and the second lens group 12 moves along the optical axis 14, respectively, in the process of focusing between the infinite distance and the closer distance. Specifically, in the process of focusing from the infinite distance to the closer distance, the first lens group 11 moves towards the object side along the optical axis 14, the second lens group 12 moves towards the image side along the optical axis 14, and the air gap between the first lens group 11 and the second lens group 12 when focused at the closer distance is greater than the air gap between the first lens group 11 and the second lens group 12 when focused at the infinite distance. For example, the air gap between the first lens group 11 and the second lens group 12 may gradually increase, but is not limited to this. In the process of focusing, the first lens group 11 and the second lens group 12 move relative to each other, which may increase the freedom degree and improve the performance at the closer distance.

In this embodiment, a focal length of the first lens group 11 is f1, and a focal length of the photographing lens system 100 is f when focused at the infinite distance. The focal length of the first lens group 11 and the focal length of the photographing lens system 100 satisfy a following relationship of f1/f:

$$0.5 < f1/f < 1.5 \quad (2).$$

The relationship (2) controls a focal power distribution between the first lens group 11 and the second lens group 12, which helps to balance a relationship between improving an optical performance and shortening a total track length (TTL). When the value of f1/f is greater than or equal to 1.5, the focal power of the first lens group 11 is too small, a spherical aberration is under-compensated, the total track length is too long, and a volume of the photographing lens system 100 is large. When the value of f1/f is less than or equal to 0.5, the focal power of the first lens group 11 is too large, the spherical aberration is over-compensated, and an emergent light converges rapidly. When an exit main point (an exit pupil position) is more close to the image side, it is not conducive for gradual divergence of light and aberration compensation of an edge field of view. Therefore, when the focal length of the first lens group 11 and the focal length of the photographing lens system 100 satisfy the above relationship (2), the focal power of the first lens group 11 may be controlled within a reasonable range to ensure the balance between the total track length (TTL) and various optical performances.

For the convenience of description, "focal length of the photographing lens system 100 when focused at the infinite distance" may be referred to as "focal length of the photographing lens system 100" below for short.

The focal length of the first lens group 11 and the focal length of the photographing lens system 100 may satisfy a following relationship of f1/f:

$$0.7 < f1/f < 1.3 \quad (3).$$

The focal length of the first lens group 11 and the focal length of the photographing lens system 100 may further satisfy a following relationship of f1/f:

$$0.8 < f1/f < 1.1 \quad (4).$$

In this embodiment, the photographing lens system 100 includes the first lens group 11 and the second lens group 12 in sequence from the object side to the image side, the first lens group 11 includes at least two aspheric lenses, the lens one in the first lens group 11 is the first lens 111 and the lens seven in the first lens group 11 is the second lens 112 in the direction Z from the object side to the image side, the first lens 111 is the aspheric lens with the positive focal power, the first surface 1111 of the first lens 111 facing the object side is a convex surface, the second lens 112 is the aspheric lens with the negative focal power, and the second lens group 12 includes the eighth lens 121 with the negative focal power. Therefore, through cooperation of the first lens group 11 and the second lens group 12, the photographing lens system 100 allows an aberration change caused by the first lens group 11 and an aberration change caused by the second lens group 12 to be compensated with each other, in the process of focusing between the infinite distance and the closer distance, so as to maintain a good image resolution ability in the process of focusing between the infinite distance and the closer distance. Moreover, the focal length of the first lens group 11 and the focal length of the photographing lens system 100 satisfy the relationship of f1/f of 0.5<f1/f<1.5. Thus, the balance between the total track length (TTL) and the optical performance may be ensured.

In this embodiment, a distance on the optical axis 14 between a vertex of the first surface 1111 of the first lens 111 facing the object side and the image plane 131 is TTL, an effective image height (half of a total diagonal length of an effective imaging area of an image sensor) is IH, and the distance (TTL) on the optical axis 14 between the vertex of the first surface 1111 of the first lens 111 facing the object side and the image plane 131 and the effective image height (IH) satisfy a following relationship of TTH/IH:

$$1.0 < TTL/IH < 2.0 \quad (5).$$

When the value of TTL/IH is greater than or equal to 2.0, the total track length is too large and a size of the photographing lens system 100 is too large. When the value of TTL/IH is less than or equal to 1.0, the total track length is too small, the performance of the edge field of view is poor, and a dark corner may occur. Therefore, when the total track length (TTL) and the effective image height (IH) satisfy the above relationship (5), the size of the photographing lens system 100 may be controlled within a reasonable range, so as to realize the miniaturization of the photographing device reasonably.

In this embodiment, a focal length of the first lens 111 is fL1, and the focal length of the first lens 111 and the focal length of the photographing lens system 100 satisfy a following relationship of fL1/f:

$$0.5 < fL1/f < 2.0 \quad (6).$$

The relationship (6) controls a light convergence ability of the first lens 111, which helps to shorten the total track length so as to reduce the size of the photographing device. When the value of fL1/f is greater than or equal to 2.0, the focal power of the first lens 111 is small, the main light convergence ability is not enough, the total track length becomes larger, and an overall volume of the photographing lens system 100 is large. When the value of fL1/f is less than or equal to 0.5, the focal power of the first lens 111 is too large, an incident light diverges after being converged, and an divergence angle of an edge light changes greatly in the latter half, resulting in a large aberration, which is not easy to correct. Therefore, when the focal length of the first lens 111 and the focal length of the photographing lens system 100 satisfy the above relationship (6), the focal power of the first lens 111 may be controlled within a reasonable range, and the overall focal power is mainly concentrated on the first lens 111, which is conducive to shortening the total track length of the photographing lens system 100 and further reducing the size of the photographing lens system 100. The focal length of the first lens 111 and the focal length of the photographing lens system 100 may satisfy a following relation: 0.6<fL1/f<1.5. The focal length of the first lens 111 and the focal length of the photographing lens system 100 may further satisfy a following relationship of fL1/f: 0.7<fL1/f<1.2.

In this embodiment, a variation d of the air gap between the first lens group 11 and the second lens group 12 and the focal length of the first lens group 11 satisfy a following relationship of d/f1:

$$0<d/f1<0.5 \qquad (7).$$

The relationship (7) controls a relative movement amount between the first lens group 11 and the second lens group 12, and balances the relationship between the total track length and the improvement of the close-distance performance. The variation of the air gap is an absolute value of a difference of the air gap between the first lens group 11 and the second lens group 12 when focused at the infinite distance and the air gap between the first lens group 11 and the second lens group 12 when focused at the closer distance.

When the value of d/f1 is greater than or equal to 0.5, the air gap between the first lens group 11 and the second lens group 12 is relatively large. When the value of d/f1 is equal to 0, the air gap between the first lens group 11 and the second lens group 12 has no relative change, and the infinite-distance and close-distance performances cannot be balanced. The variation d of the air gap between the first lens group 11 and the second lens group 12 and the focal length of the first lens group 11 may satisfy a following relationship of d/f1: 0<d/f1<0.3. The variation d of the air gap between the first lens group 11 and the second lens group 12 and the focal length of the first lens group 11 may further satisfy a following relationship of d/f1: 0<d/f1<0.2.

In this embodiment, a focal length of the second lens 112 is fL2, a focal length of the second lens group 12 is f2, and the focal length of the second lens 112 and the focal length of the second lens group 12 satisfy a following relationship of fL2/f2:

$$|fL2/f2|<5.0 \qquad (8).$$

The relationship (8) controls a relationship of a focal power distribution between the second lens 112 and the second lens group 12. The second lens group 12 shares part of the focal power of the second lens 112, which is originally used to shorten the back focal length and improve the performance of the edge field of view. Also, the second lens group 12 moves along the optical axis 14, which is conducive to balancing the requirements of improving the close-distance performance and shortening the back focal length. The second lens 112 may be a positive lens or a negative lens. In most cases, the focal length of the second lens 112 is the same with the focal length of the second lens group 12 in terms of their symbols (their symbols are the same, both positive or both negative). Of course, in other embodiments, the position of the second lens group 12 may also be fixed.

When the value of |fL2/f2| is greater than or equal to 5.0, the focal length fL2 is large, the focal power is relatively small, and the focal power of the second lens group 12 is relatively large, which plays a major role in the aberration compensation. When the second lens group 12 moves along the optical axis 14, the relative movement amount of the first lens group 11 decreases and the movement amount of the second lens group 12 increases, in the process of focusing from the infinite distance to the closer distance. Moreover, the curvature change nearby an inflection point of the sixteenth surface 1212 facing the image side of the eighth lens 121 in the second lens group 12 also increases. If the position of the second lens group 12 is fixed in the process of focusing, a propagation optical path difference of upper and lower lights of each field of view at this lens group will increase in the process of focusing from the infinite distance to the closer distance, which is manifested as a large variation of aberration such as coma (comatic aberration), astigmatism, distortion, chromatic aberration of magnification and a large drop of modulation transfer function (MTF).

Therefore, when the focal length of the second lens 112 and the focal length of the second lens group 12 satisfy the above relationship (8), the second lens group 12 may share the focal power of the first lens group 11, especially the focal power of the lens (i.e. the second lens 112) closest to the image plane 131 in the first lens group 11, so as to reduce the curvature change of the inflection point on the curved surface of the lens (i.e. the second lens 112) closest to the image plane 131. Thus, the change of the optical performance in the process of focusing is reduced, and the close-distance performance is improved.

The focal length of the second lens 112 and the focal length of the second lens group 12 may satisfy a following relationship of fL2/f2: 0.03<|fL2/f2|<4.0. The focal length of the second lens 112 and the focal length of the second lens group 12 may further satisfy a following relationship of fL2/f2: 0.05<|fL2/f2|<3.6.

In this embodiment, an abbe number of the first lens 111 of the photographing lens system is Vd1, and a refractive index of the first lens 111 is Nd1. The abbe number of the first lens 111 and the refractive index of the first lens 111 satisfy a following relationship of Vd1/Nd1:

$$30.0<Vd1/Nd1<40.0 \qquad (9).$$

The relationship (9) controls the material selection of the first lens 111 and improves the compensation of on-axis chromatic aberration and spherical aberration. When this ratio is greater than or equal to 40.0, the refractive index of the first lens 111 is relatively low, which is not conducive to the compensation of spherical aberration. When this ratio is less than or equal to 30.0, the abbe number of the first lens 111 is relatively small, which is not conducive to the compensation of on-axis chromatic aberration. The abbe number of the first lens 111 and the refractive index of the first lens 111 may satisfy a following relationship of Vd1/Nd1: 32.0<Vd1/Nd1<38.0. The abbe number of the first lens 111 and the refractive index of the first lens 111 may further satisfy a following relationship of Vd1/Nd1: 33.0<Vd1/Nd1<37.0.

In this embodiment, the distance on the optical axis 14 between the vertex of the surface facing the object side of the first lens 111 of the photographing lens system and the image plane 131 and the focal length of the photographing lens system 100 satisfy a following relationship of TTL/f:

$$1.0<TTL/f<5.0 \qquad (10).$$

The relationship (10) controls the relationship between the total track length and the focal length of the photographing lens system 100, so as to select a reasonable total track length to satisfy the needs of miniaturization of the photographing device. The distance on the optical axis 14 between the vertex of the surface facing the object side of the first lens 111 of the photographing lens system 100 and the image plane 131 and the focal length of the photographing lens system 100 may satisfy a following relationship of TTL/F:

1.0<TTL/F<3.0. The distance on the optical axis 14 between the vertex of the surface facing the object side of the first lens 111 of the photographing lens system 100 and the image plane 131 and the focal length of the photographing lens system may further satisfy a following relationship of TTL/F: 1.0<TTL/F<2.0.

In this embodiment, as illustrated in FIG. 1, the photographing lens system 100 may further include a filter element 15 located between the second lens group 12 and the image plane 131 without affecting the focal length of the photographing lens system 100. The filter element 15 may include, but is not limited to, a low-pass filter, an infrared cut-off filter, a micro lens, and an RGB dichroic filter.

In this embodiment, the photographing lens system 100 may further include an aperture to control the amount of light passing through the photographing lens system 100 and entering the image plane 131. An aperture value of the photographing lens system 100 is Fno, Fno is 2.30, and the focal length f of the photographing lens system 100 is 7.90.

In this embodiment, the photographing lens system 100 may further include at least one diaphragm, such as an aperture diaphragm, a blazed diaphragm or a field diaphragm, for reducing stray light. The diaphragm may be located on a side of the first lens group 11 facing the object side.

In this embodiment, the focal length f1 of the first lens group 11 is 7.76, and the focal length f2 of the second lens group 12 is −195.79. The value of f1/f is 0.98, the value of TTL/IH is 1.45, the value of fL1/f is 0.91, the value of d/f1 is 0.18, the value of |fL2/f2| is 0.06, the value of Vd1/Nd1 is 36.3, and the value of TTL/f is 1.31.

In this embodiment, the structure data of the photographing lens system 100 is illustrated in Table 1, the aspheric data is illustrated in Table 2, in which k is a conical coefficient in an aspheric curve equation, A3~A18 are aspheric coefficients of 4th~18th order of each surface, and the focal length data of each lens is illustrated in Table 3.

TABLE 1

| Num | R' | thi | Nd | Vd | radius |
|---|---|---|---|---|---|
| 1(STO) | plane | −0.38 | | | |
| 2 | 4.005 | 0.72 | 1.543 | 56.0 | 1.7 |

TABLE 1-continued

| Num | R' | thi | Nd | Vd | radius |
|---|---|---|---|---|---|
| 3 | −237.079 | 0.10 | | | |
| 4 | 4.042 | 0.36 | 1.632 | 24.0 | 1.6 |
| 5 | 2.726 | 0.50 | | | |
| 6 | −19.416 | 0.63 | 1.543 | 56.0 | 1.5 |
| 7 | −6.735 | 0.57 | | | |
| 8 | −6.134 | 0.59 | 1.543 | 56.0 | 1.8 |
| 9 | −5.641 | 0.80 | | | |
| 10 | −2.817 | 0.32 | 1.667 | 19.2 | 2.2 |
| 11 | −4.439 | 0.10 | | | |
| 12 | −3.162 | 0.74 | 1.543 | 56.0 | 2.8 |
| 13 | −1.862 | 0.35 | | | |
| 14 | 4.197 | 1.11 | 1.534 | 55.7 | 5.0 |
| 15 | 2.213 | d15 | | | |
| 16 | −446.274 | 0.70 | 1.566 | 37.4 | 5.8 |
| 17 | 148.869 | d17 | | | |
| 18 | plane | 0.21 | 1.516 | 64.2 | 7.0 |
| 19 | plane | 0.52 | | | |
| 20 | image plane | — | | | |

Num denotes ordinal numbers of surfaces arranged in sequence from the object side to the image side. For example, surface one is the seventeenth surface (not illustrated) of the aperture diaphragm (STO), surface two is the first surface 1111 of the first lens 111, surface three is the second surface 1112 of the first lens 111, . . . , and surface fourteen is the thirteenth surface 1121 of the second lens 112, surface fifteen is the fourteenth surface 1112 of the second lens 112, surface sixteen is the fifteenth surface 1211 of the eighth lens 121, surface seventeen is the sixteenth surface 1212 of the eighth lens 121, surface eighteen is an eighteenth surface 151 of the filter element 15 facing the object side, surface nineteen is a nineteenth surface 152 of the filter element 15 facing the image side, and surface twenty is the image plane 131. R' is the curvature, this is a thickness on the optical axis 14, Nd is the refractive index, Vd is the abbe number, d15 is the air gap between surface fifteen and surface sixteen, that is, the air gap between the first lens group 11 and the second lens group 12, d17 is the air gap between the surface seventeen and the surface eighteen, that is, the air gap between the second lens group 12 and the eighteenth surface 151, the radius is half of the aperture of the lens, and the plane is an air plane. A blank indicates that there is no corresponding data.

TABLE 2

| Num | K | A3 | A4 | A5 | A6 |
|---|---|---|---|---|---|
| 2 | 3.01889E+00 | | −5.70983E−03 | | −1.17554E−03 |
| 3 | 1.50000E+01 | | −1.96908E−03 | | 2.59522E−03 |
| 4 | 2.78949E+00 | | −2.66254E−02 | | 2.90687E−03 |
| 5 | 4.92274E−01 | | −2.61884E−02 | | 1.31550E−03 |
| 6 | 1.40069E+01 | | −5.10454E−03 | | −1.59333E−03 |
| 7 | 1.16377E+01 | | −8.56486E−03 | | −1.71535E−03 |
| 8 | 9.10606E+00 | | −1.56990E−02 | | −2.25898E−03 |
| 9 | 4.84411E+00 | | −1.06696E−02 | | −6.82839E−04 |
| 10 | 5.09981E−01 | −7.46574E−03 | −1.21894E−02 | 1.12429E−03 | 1.16897E−03 |
| 11 | 8.77278E−01 | −2.55539E−02 | −9.84962E−03 | 2.70470E−03 | 2.88956E−04 |
| 12 | −4.72169E+00 | −4.13285E−02 | 1.43266E−02 | 1.23020E−03 | −1.43470E−03 |
| 13 | −3.17194E+00 | −4.22734E−02 | 6.71859E−03 | 1.85055E−03 | 5.44784E−04 |
| 14 | −7.14613E−01 | −3.04334E−02 | −5.87092E−03 | 3.61378E−04 | 4.58818E−04 |
| 15 | −7.07016E+00 | 1.08010E−02 | −1.82434E−02 | 4.54043E−03 | −2.34127E−04 |
| 16 | 9.90000E+01 | | 3.39060E−03 | | −9.59427E−04 |
| 17 | 0.00000E+00 | | 3.41735E−03 | | −7.08980E−04 |

| Num | A7 | A8 | A9 | A10 | A11 | A12 |
|---|---|---|---|---|---|---|
| 2 | | −1.43157E−04 | | −1.13920E−04 | | 2.19452E−05 |
| 3 | | −1.62355E−03 | | 4.93536E−04 | | −5.42575E−05 |
| 4 | | −6.61849E−04 | | −1.26593E−04 | | 2.06580E−05 |
| 5 | | −3.47058E−04 | | 3.27593E−05 | | −6.73652E−05 |
| 6 | | −3.18691E−04 | | −2.23064E−04 | | 5.40608E−05 |

TABLE 2-continued

| Num | | | | | | |
|---|---|---|---|---|---|---|
| 7 | | −8.46788E−05 | | 1.11259E−06 | | −4.40208E−06 |
| 8 | | 3.36420E−04 | | −6.66879E−05 | | 2.75333E−06 |
| 9 | | 4.10659E−05 | | 1.76404E−06 | | −3.19988E−06 |
| 10 | 5.99811E−04 | 5.43183E−04 | 2.26950E−05 | −2.36020E−05 | −9.51703E−06 | −7.39560E−06 |
| 11 | 3.89584E−05 | 1.93256E−04 | −6.00530E−06 | −7.38955E−06 | −3.27178E−07 | −4.80698E−07 |
| 12 | −8.57413E−05 | 1.17000E−04 | −1.11719E−05 | −8.00073E−06 | 6.82795E−07 | 5.31081E−07 |
| 13 | 5.98284E−05 | −3.61261E−05 | −3.22361E−06 | 3.01627E−07 | −2.91180E−07 | −6.81983E−08 |
| 14 | −3.63090E−06 | −1.25893E−05 | 5.86011E−08 | 9.67036E−08 | −6.58743E−09 | 2.24460E−09 |
| 15 | −5.09389E−05 | −1.88288E−06 | 1.05713E−06 | 1.03023E−07 | −2.44378E−09 | −1.78269E−09 |
| 16 | | 1.11669E−04 | | −7.76837E−06 | | 3.29479E−07 |
| 17 | | 6.57404E−05 | | −3.68438E−06 | | 1.27133E−07 |

| Num | A13 | A14 | A15 | A16 | A17 | A18 |
|---|---|---|---|---|---|---|
| 2 | | 8.16744E−06 | | −4.37148E−06 | | 0.00000E+00 |
| 3 | | −5.51882E−06 | | 0.00000E+00 | | 0.00000E+00 |
| 4 | | 1.38976E−05 | | −6.76230E−06 | | 0.00000E+00 |
| 5 | | 1.50101E−05 | | −3.13495E−06 | | 0.00000E+00 |
| 6 | | 8.10138E−07 | | −5.05539E−06 | | 0.00000E+00 |
| 7 | | −5.79425E−06 | | 1.93324E−06 | | 0.00000E+00 |
| 8 | | 4.19015E−06 | | 1.88127E−07 | | 0.00000E+00 |
| 9 | | 8.78525E−07 | | −2.59754E−07 | | 0.00000E+00 |
| 10 | −9.22831E−07 | −5.64015E−08 | 1.20095E−07 | 7.60767E−08 | 1.90789E−08 | 1.45405E−09 |
| 11 | −8.28190E−08 | −2.09069E−08 | −1.29533E−08 | −4.58154E−09 | −1.87881E−09 | −1.81806E−09 |
| 12 | 1.61648E−07 | 4.20577E−08 | 7.27003E−09 | −4.93412E−10 | −1.06413E−09 | −5.77179E−10 |
| 13 | −3.64097E−09 | 2.20801E−09 | 1.29026E−09 | 4.20396E−10 | 4.44238E−11 | −3.52193E−11 |
| 14 | −1.19237E−10 | −1.45713E−11 | 5.45309E−12 | −9.14195E−13 | −1.06318E−14 | 3.37733E−15 |
| 15 | −1.99328E−10 | 1.34751E−11 | 2.59770E−12 | 1.32398E−12 | 5.11284E−14 | −6.28246E−14 |
| 16 | | −8.47157E−09 | | 1.22099E−10 | | −7.58379E−13 |
| 17 | | −2.68282E−09 | | 3.20050E−11 | | −1.65995E−13 |

TABLE 3

| Element | Start surface | Focal length |
|---|---|---|
| 1 | 2 | 7.22 |
| 2 | 4 | −14.66 |
| 3 | 6 | 18.57 |
| 4 | 8 | 90.33 |
| 5 | 10 | −12.37 |
| 6 | 12 | 6.91 |
| 7 | 14 | −10.84 |
| 8 | 16 | −195.79 |

Element denotes ordinal numbers of the lenses arranged in sequence from the object side to the image side, and start surface is an ordinal number of a start surface of the lens. The start surface is the surface close to the object side.

In this embodiment, as illustrated in Table 3, the focal length of the first lens 111 is 7.22, the focal length of the second lens 112 is −10.84, the focal length of the third lens 113 is −14.66, the focal length of the fourth lens 114 is 18.57, the focal length of the fifth lens 115 is 90.33, the focal length of the sixth lens 116 is −12.37, the focal length of the seventh lens 117 is 6.91, and the focal length of the eighth lens 121 is −195.79.

In this embodiment, when the distance of the object to be photographed is the infinite distance (INF) or the closer distance (100 mm), the data of d15 and d17 is illustrated in Table 4.

TABLE 4

| | infinite distance | closer distance |
|---|---|---|
| Distance of object to be photographed | INF | 100 mm |
| d15 | 0.93 | 2.40 |
| d17 | 1.10 | 0.40 |

As can be seen from Table 4, d15 is 0.93 and d17 is 1.10 when the distance of the object to be photographed is the infinite distance (INF), and d15 is 2.40 and d17 is 0.40 when the distance of the object to be photographed is the closer distance (100 mm).

Figure 2:
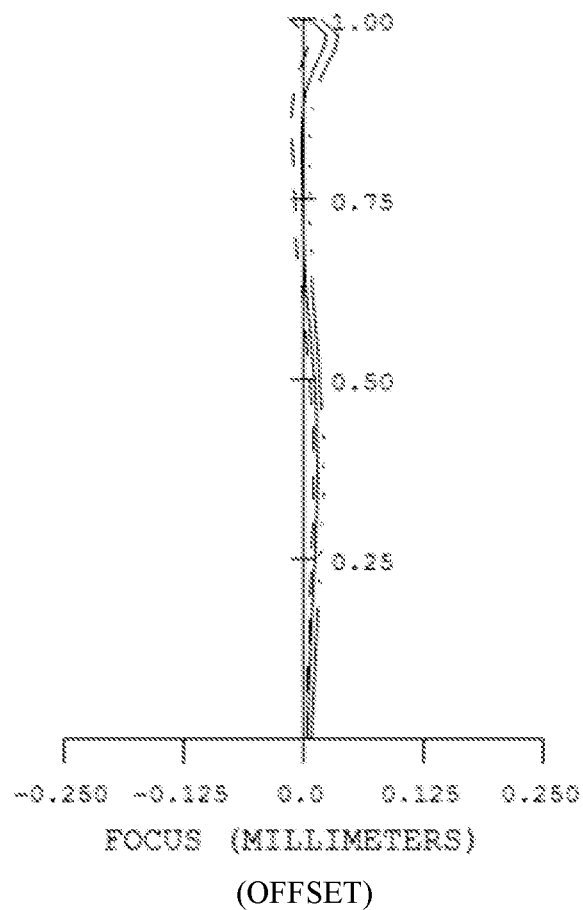
FIG. 2 is a spherical aberration curve diagram according to an illustrative embodiment of the present disclosure.
Figure 3:
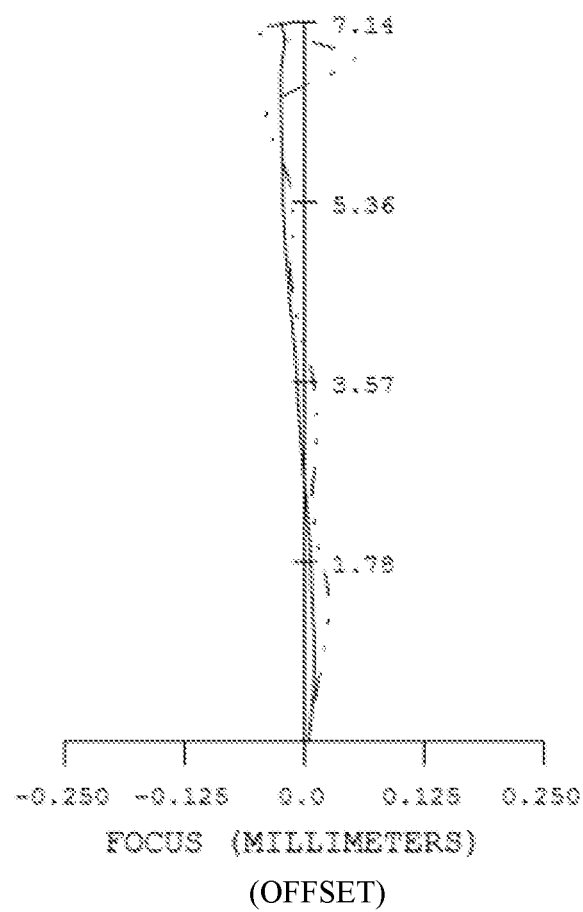
FIG. 3 is a diagram of astigmatic field curves according to an illustrative embodiment of the present disclosure.
Figure 4:
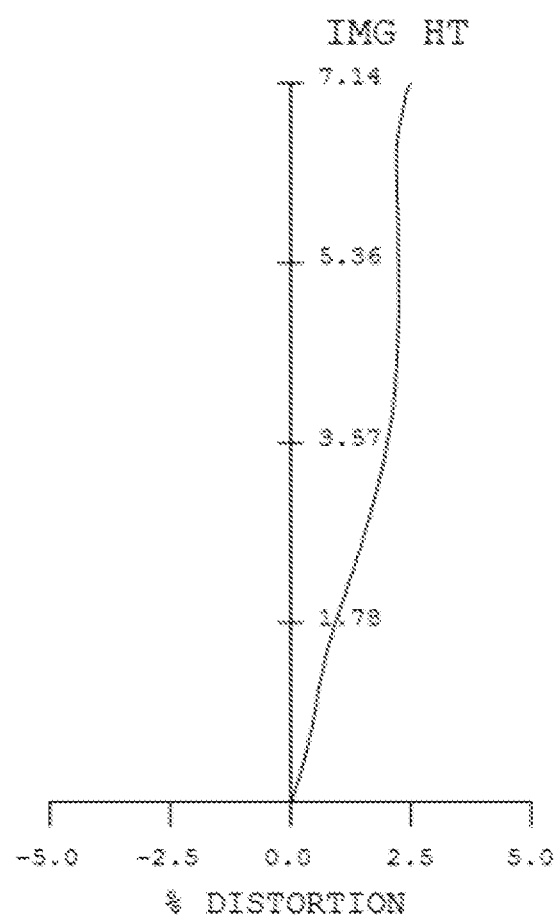
FIG. 4 is a distortion curve diagram according to an illustrative embodiment of the present disclosure.

In this embodiment, a spherical aberration (LONGITUDINAL SPHERICAL ABER.) curve diagram of the photographing lens system 100 is illustrated in FIG. 2, a diagram of astigmatic field curves is illustrated in FIG. 3, and a distortion curve diagram is illustrated in FIG. 4. In FIG. 2, a horizontal axis denotes a focus offset in millimeters, and a vertical axis denotes an on-axis incident distance in millimeters when light enters the lens. FIG. 2 shows a spherical aberration curve of an incident light with a wavelength of 656.3000 NM (nanometer), a spherical aberration curve of an incident light with a wavelength of 587.6000 NM and a spherical aberration curve of an incident light with a wavelength of 486.0000 NM. In FIG. 3, a horizontal axis denotes the focus offset in millimeters, and a vertical axis denotes an image height (IMG HT) in millimeters. FIG. 3 shows a curve T of a meridianal field curve of an incident light with a wavelength of 587.6000 NM and a curve S of a sagittal field curve of the incident light with the wavelength of 587.6000 NM. In FIG. 4, a horizontal axis denotes a distortion rate, and a vertical axis denotes an image height in millimeters.

In this embodiment, an overall image quality of the photographing lens system 100 may be greatly improved and an imaging range may be expanded. When an electronic zoom is performed, a better image quality and a better close-distance effect may be obtained.

In this embodiment, by increasing the focal power cooperation of the second lens group 12 and the first lens group 11, a reverse difference on the surface of the lens with the inflection point in the first lens group 11 is reduced, so as to reduce the change of aberration such as the field curve and the drop of MTF in the process of focusing from the infinite distance to the closer distance. The decrease of the MTF drop refers to the decrease of the MTF change. In addition, in the process of focusing, the position of the second lens group 12 is slightly changed in cooperation with the first lens group 11, so as to realize the lens having a high image quality and a low profile in cooperation with the image sensor of a large size.

Figure 5:
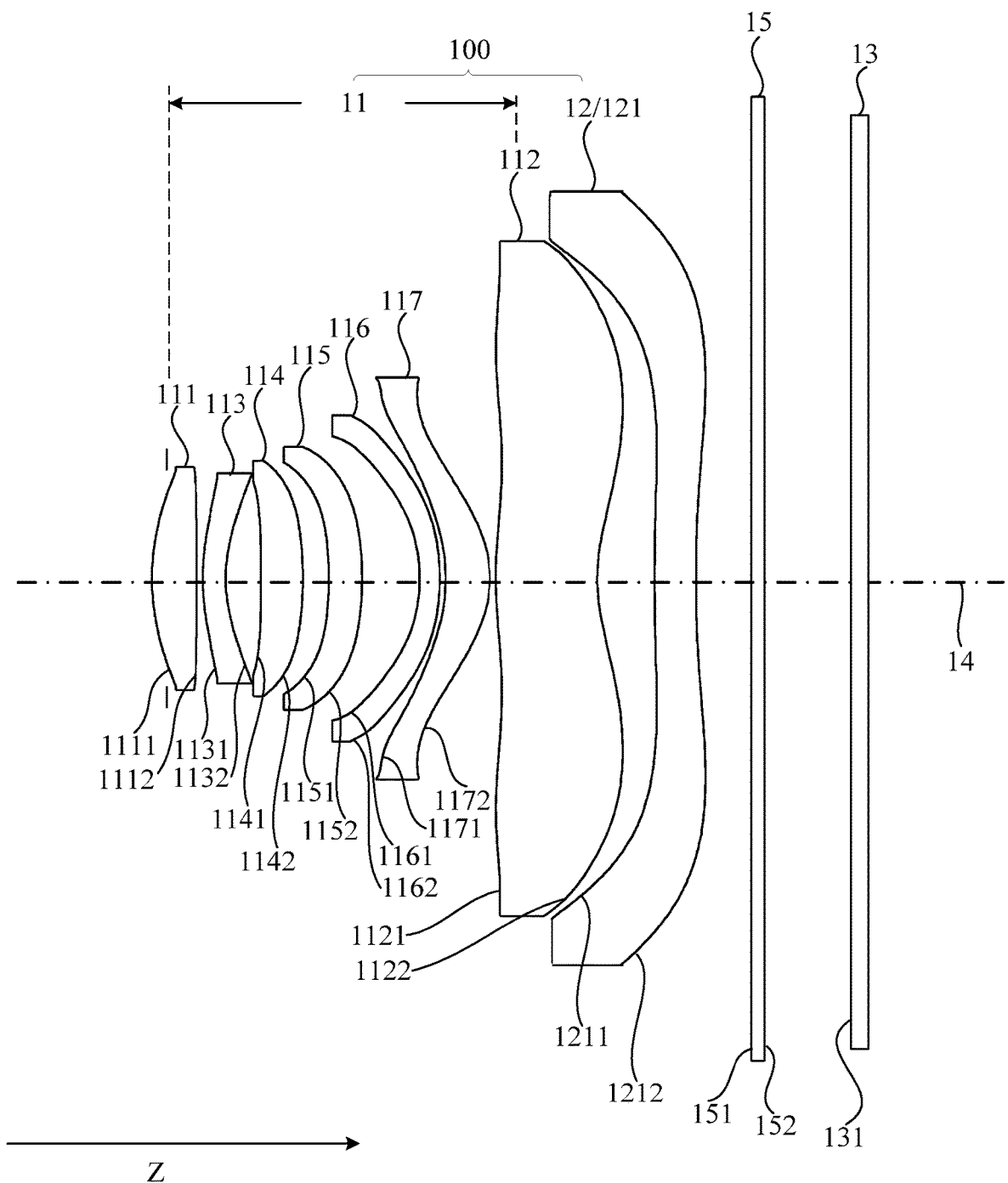
FIG. 5 is a schematic view of a photographing lens system according to another illustrative embodiment of the present disclosure.

FIG. 5 is a schematic view of the photographing lens system 100 according to another illustrative embodiment. In this embodiment, the first lens group 11 includes seven lenses, and the second lens group 12 includes one lens.

As illustrated in FIG. 5, in this embodiment, the first lens group 11 includes a first lens 111, a third lens 113, a fourth lens 114, a fifth lens 115, a sixth lens 116, a seventh lens 117, and a second lens 112 in sequence from an object side to an image side. The first lens 111 is an aspheric lens with a positive focal power. The third lens 113 has a negative focal power. The fourth lens 114 has a positive focal power. The fifth lens 115 has a positive focal power. The sixth lens 116 has a negative focal power. The seventh lens 117 has a positive focal power, and the second lens 112 is an aspheric lens with a negative focal power.

As illustrated in FIG. 5, in this embodiment, the second lens group 12 includes one eighth lens 121 with a negative focal power.

In this embodiment, in the process of focusing from the infinite distance to the closer distance, the first lens group 11 moves towards the object side along the optical axis 14, and the second lens group 12 moves towards the image side. The air gap between the first lens group 11 and the second lens group 12 when focused at the closer distance is greater than the air gap between the first lens group 11 and the second lens group 12 when focused at the infinite distance. For example, the air gap between the first lens group 11 and the second lens group 12 may gradually increase, but is not limited to this.

It should be noted that, in other embodiments, when the focal length of the first lens group 11 and the focal length of the second lens group 12 both have the positive symbol and close to each other, each of the first lens group 11 and the second lens group 12 may move along the optical axis 14 in the process of focusing from the infinite distance to the closer distance, and the air gap between the first lens group 11 and the second lens group 12 may be reduced.

It should be noted that, in other embodiments, the number of the lenses in the first lens group 11 is not limited to seven provided in the embodiment of the present disclosure, and the number of the lenses in the second lens group 12 is not limited to one provided in the embodiment of the present disclosure. The number of the lenses in the first lens group 11 and the number of the lenses in the second lens group 12 may be set according to actual requirements.

In this embodiment, Fno is 2.3, and the focal length of the photographing lens system 100 is 7.9. The focal length f1 of the first lens group 11 is 7.76, and the focal length f2 of the second lens group 12 is −71.77. The value of f1/f is 0.98, the value of TTL/IH is 1.45, the value of fL1/F is 0.92, the value of d/f1 is 0.18, the value of |fL2/f2| is 0.18, the value of Vd1/Nd1 is 36.3, and the value of TTL/f is 1.31.

In this embodiment, the structural data of the photographing lens system 100 is illustrated in Table 5, the aspheric data is illustrated in Table 6, and the focal length data of each lens is illustrated in Table 7. The meanings of the letters in Tables 5 to 7 are the same with those in Tables 1 to 3, which will not be repeated herein.

TABLE 5

| Num | R' | thi | Nd | Vd | radius |
|---|---|---|---|---|---|
| 1(STO) | plane | −0.38 | | | |
| 2 | 4.017 | 0.71 | 1.543 | 56.0 | 1.7 |
| 3 | −260.907 | 0.10 | | | |
| 4 | 3.995 | 0.37 | 1.632 | 24.0 | 1.6 |
| 5 | 2.676 | 0.58 | | | |
| 6 | −21.564 | 0.67 | 1.543 | 56.0 | 1.6 |
| 7 | −6.571 | 0.42 | | | |
| 8 | −6.278 | 0.53 | 1.543 | 56.0 | 1.9 |
| 9 | −5.558 | 0.92 | | | |
| 10 | −2.811 | 0.32 | 1.667 | 19.2 | 2.3 |
| 11 | −4.383 | 0.10 | | | |
| 12 | −3.035 | 0.71 | 1.543 | 56.0 | 3.0 |
| 13 | −1.914 | 0.10 | | | |
| 14 | 5.793 | 1.62 | 1.534 | 55.7 | 5.0 |
| 15 | 2.827 | d15 | | | |
| 16 | 56.319 | 0.66 | 1.582 | 28.2 | 5.5 |
| 17 | 24.020 | d17 | | | |
| 18 | plane | 0.21 | 1.516 | 64.2 | 7.0 |
| 19 | plane | 0.52 | | | |
| 20 | image plane | — | | | |

Tables 6 and 7 are illustrated in the next page.

Figure 6:
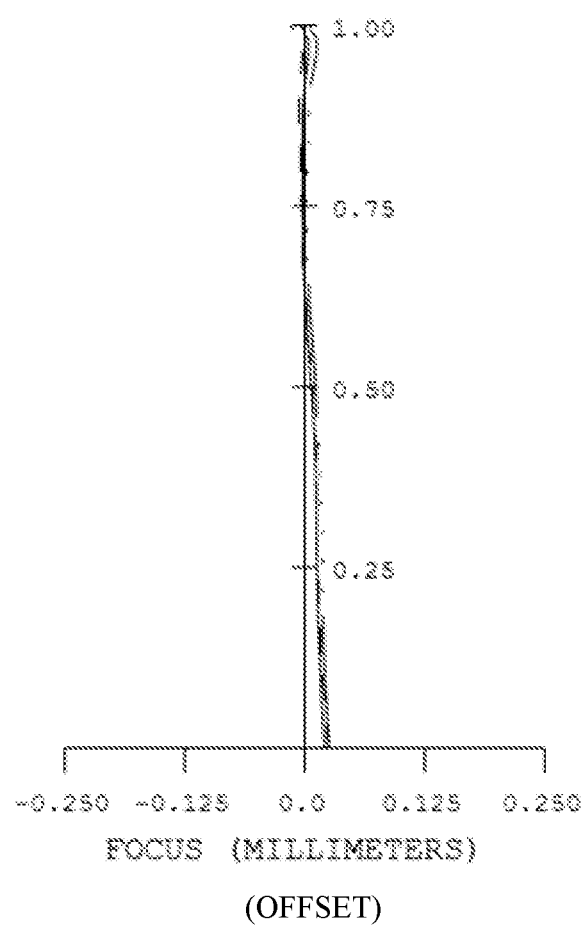
FIG. 6 is a spherical aberration curve diagram according to another illustrative embodiment of the present disclosure.
Figure 7:
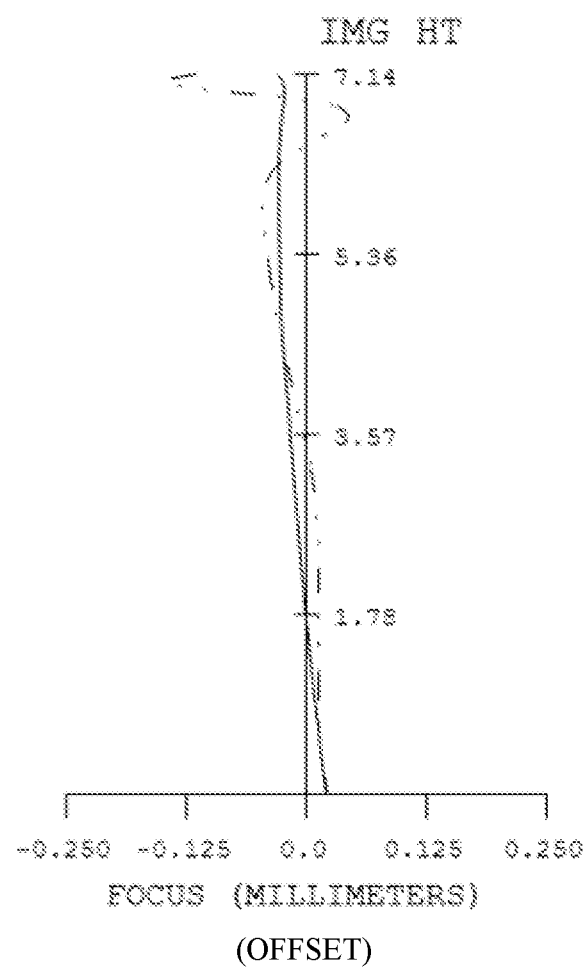
FIG. 7 is a diagram of astigmatic field curves according to another illustrative embodiment of the present disclosure.
Figure 8:
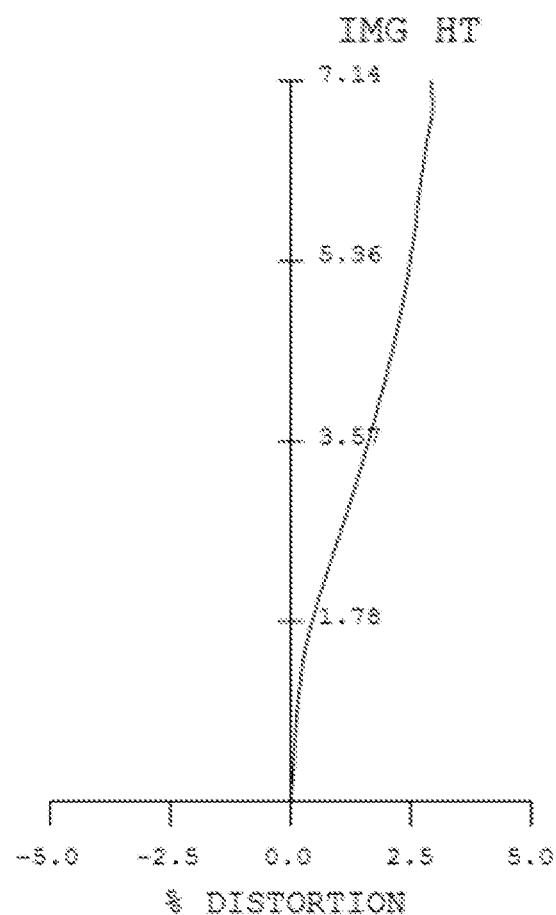
FIG. 8 is a distortion curve diagram according to another illustrative embodiment of the present disclosure.

In this embodiment, a spherical aberration curve diagram of the photographing lens system 100 is illustrated in FIG. 6, a diagram of astigmatic field curves is illustrated in FIG. 7, and a distortion curve diagram is illustrated in FIG. 8. FIG. 6 shows a spherical aberration curve of an incident light with a wavelength of 656.3000 NM, a spherical aberration curve of an incident light with a wavelength of 587.6000 NM and a spherical aberration curve of an incident light with a wavelength of 486.0000 NM. FIG. 7 shows a curve T of a meridianal field curve of an incident light with a wavelength of 587.6000 NM and a curve S of a sagittal field curve of the incident light with the wavelength of 587.6000 NM.

TABLE 6

| Num | K | A3 | A4 | A5 | A6 |
|---|---|---|---|---|---|
| 2 | 2.87701E+00 | | −5.23091E−03 | | −1.05197E−03 |
| 3 | −9.90000E+01 | | −2.74606E−03 | | 2.51284E−03 |
| 4 | 3.35616E+00 | | −2.90811E−02 | | 2.37167E−03 |
| 5 | 5.32709E−01 | | −2.72988E−02 | | 1.45806E−03 |
| 6 | −2.14589E+01 | | −4.80725E−03 | | −1.47926E−03 |
| 7 | 1.00801E+01 | | −8.79479E−03 | | −1.79078E−03 |
| 8 | 9.69174E+00 | | −1.69482E−02 | | −2.44443E−03 |
| 9 | 5.46142E+00 | | −1.06545E−02 | | −7.13091E−04 |
| 10 | 4.63385E−01 | −8.30563E−03 | −1.41825E−02 | 1.73713E−03 | 1.75452E−03 |
| 11 | 5.21495E−01 | −3.04138E−02 | −7.33205E−03 | 2.90075E−03 | 1.22035E−04 |
| 12 | −6.23055E+00 | −3.57597E−02 | 1.33114E−02 | 9.10105E−04 | −1.49093E−03 |
| 13 | −3.01904E+00 | −3.62900E−02 | 6.23193E−03 | 1.83743E−03 | 5.64632E−04 |
| 14 | −4.25468E−01 | −2.82706E−02 | −4.86635E−03 | 5.66725E−04 | 4.77496E−04 |

TABLE 6-continued

| | | | | | |
|---|---|---|---|---|---|
| 15 | −9.77910E+00 | 8.66230E−03 | −1.67742E−02 | 4.48342E−03 | −2.79686E−04 |
| 16 | 9.89840E+01 | | 2.23081E−03 | | −9.59427E−04 |
| 17 | 1.30507E+01 | | 2.40594E−03 | | −7.01411E−04 |

| Num | A7 | A8 | A9 | A10 | A11 | A12 |
|---|---|---|---|---|---|---|
| 2 | | −1.56086E−04 | | −1.26665E−04 | | 2.19747E−05 |
| 3 | | −1.57028E−03 | | 4.65873E−04 | | −7.04456E−05 |
| 4 | | −5.34241E−04 | | −1.33231E−04 | | −1.49360E−05 |
| 5 | | −3.42315E−04 | | 2.98357E−05 | | −7.15916E−05 |
| 6 | | −2.84356E−04 | | −2.14850E−04 | | 5.83123E−05 |
| 7 | | −7.62522E−05 | | 1.24829E−06 | | −3.90302E−06 |
| 8 | | 3.00288E−04 | | −7.46501E−05 | | 2.45202E−06 |
| 9 | | 4.48832E−05 | | 1.89432E−06 | | −3.05072E−06 |
| 10 | 7.66744E−04 | 5.44786E−04 | 1.70488E−06 | −3.51191E−05 | −1.30757E−05 | −7.85470E−06 |
| 11 | −4.65491E−06 | 1.97563E−04 | −1.19738E−07 | −5.43103E−06 | −1.01722E−07 | −6.01375E−07 |
| 12 | −9.30668E−05 | 1.17748E−04 | −9.99156E−06 | −7.39774E−06 | 8.94442E−07 | 5.86190E−07 |
| 13 | 6.59490E−05 | −3.48032E−05 | −3.01553E−06 | 3.15876E−07 | −2.98792E−07 | −7.28226E−08 |
| 14 | −5.88952E−06 | −1.39099E−05 | −2.25137E−07 | 6.18319E−08 | −7.93763E−09 | 3.05891E−09 |
| 15 | −5.34484E−05 | −1.08489E−06 | 1.22616E−06 | 1.19517E−07 | −3.83728E−09 | −2.53921E−09 |
| 16 | | 1.11669E−04 | | −7.76837E−06 | | 3.29479E−07 |
| 17 | | 6.57665E−05 | | −3.68357E−06 | | 1.27094E−07 |

| Num | A13 | A14 | A15 | A16 | A17 | A18 |
|---|---|---|---|---|---|---|
| 2 | | 8.67256E−06 | | −4.50875E−06 | | |
| 3 | | −2.15974E−06 | | | | |
| 4 | | 1.50722E−05 | | −5.43149E−06 | | |
| 5 | | 1.57653E−05 | | −2.81781E−06 | | |
| 6 | | 8.18336E−07 | | −5.05534E−06 | | |
| 7 | | −5.75145E−06 | | 2.05333E−06 | | |
| 8 | | 3.81935E−06 | | 1.84439E−07 | | |
| 9 | | 8.32234E−07 | | −2.76327E−07 | | |
| 10 | −7.26091E−07 | 1.33882E−07 | 2.05194E−07 | 9.74222E−08 | 1.67592E−08 | −6.25629E−09 |
| 11 | −1.78579E−07 | −6.18653E−08 | −2.58232E−08 | −7.48980E−09 | −1.98869E−09 | −1.59361E−09 |
| 12 | 1.70718E−07 | 4.22015E−08 | 6.56232E−09 | −8.50845E−10 | −1.15212E−09 | −5.68398E−10 |
| 13 | −5.21628E−09 | 1.79655E−09 | 1.18398E−09 | 3.98583E−10 | 3.93392E−11 | −2.84740E−11 |
| 14 | 1.24015E−10 | 3.42979E−11 | 1.23259E−11 | −3.14124E−13 | −1.49143E−13 | −6.72039E−14 |
| 15 | −2.72444E−10 | 5.55579E−12 | 1.68426E−12 | 1.81125E−12 | 9.09552E−14 | −6.55456E−14 |
| 16 | | −8.47157E−09 | | 1.22099E−10 | | −7.58379E−13 |
| 17 | | −2.68282E−09 | | 3.20359E−11 | | −1.67137E−13 |

TABLE 7

| Element | Start surface | Focal length |
|---|---|---|
| 1 | 2 | 7.25 |
| 2 | 4 | −14.22 |
| 3 | 6 | 17.05 |
| 4 | 8 | 70.46 |
| 5 | 10 | −12.61 |
| 6 | 12 | 7.76 |
| 7 | 14 | −12.71 |
| 8 | 16 | −71.77 |

In this embodiment, when the distance of the object to be photographed is the infinite distance (INF) or the closer distance (100 mm), the data of d15 and d17 is illustrated in Table 8.

TABLE 8

| | infinite distance | closer distance |
|---|---|---|
| distance of object to be photographed | INF | 100 mm |
| d15 | 0.92 | 2.31 |
| d17 | 0.90 | 0.22 |

As can be seen from Table 8, d15 is 0.92 and d17 is 0.90 when the distance of the object to be photographed is the infinite distance (INF), and d15 is 2.31 and d17 is 0.22 when the distance of the object to be photographed is the closer distance (100 mm).

In this embodiment, an overall image quality of the photographing lens system 100 may be greatly improved and the imaging range may be expanded. When the electronic zoom is performed, a better image quality and a better close-distance effect may be obtained.

Figure 9:
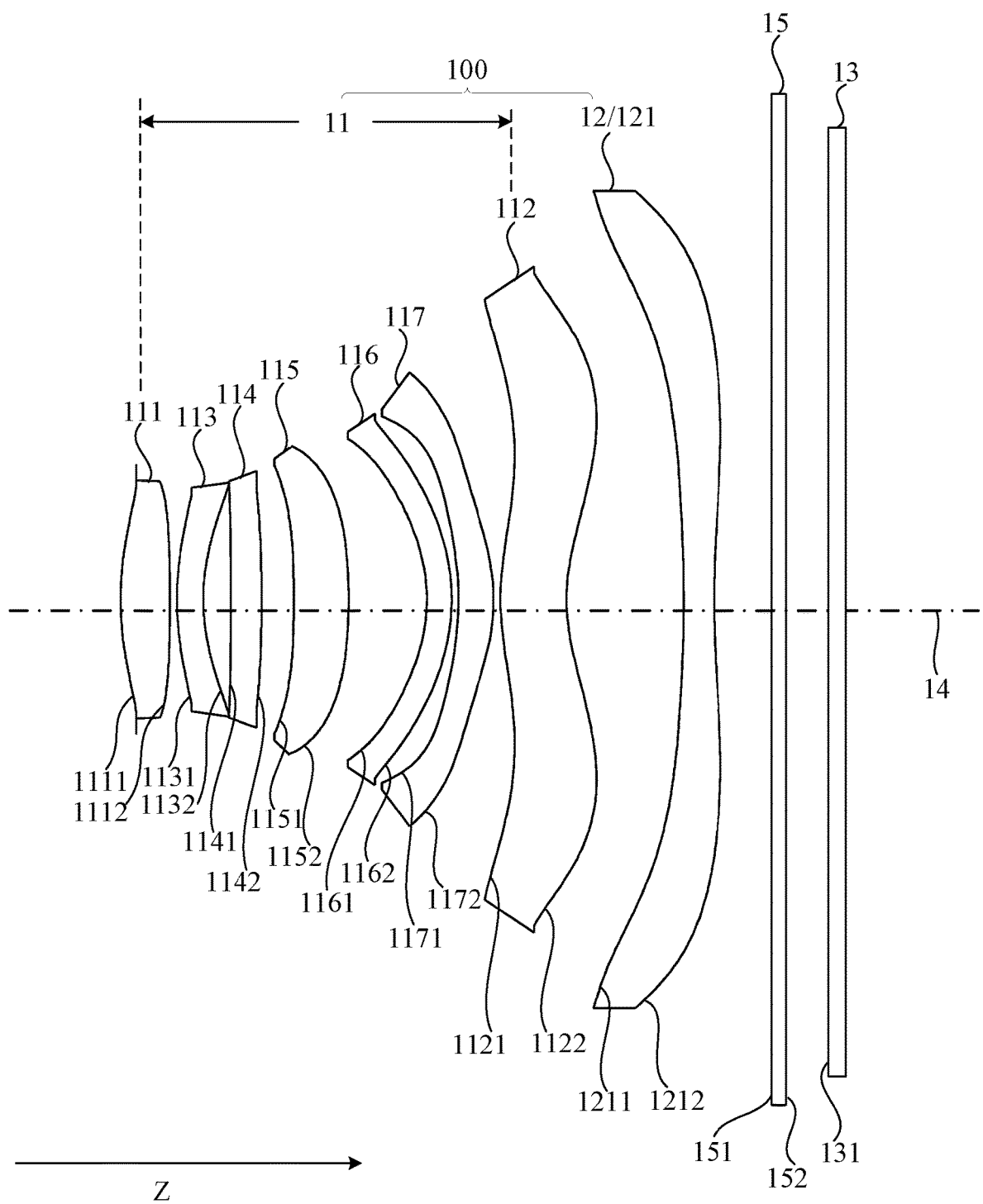
FIG. 9 is a schematic view of a photographing lens system according to another illustrative embodiment of the present disclosure.

FIG. 9 is a schematic view of a photographing lens system 100 according to another illustrative embodiment. In this embodiment, the first lens group 11 includes seven lenses, and the second lens group 12 includes one lens.

As illustrated in FIG. 9, in this embodiment, the first lens group 11 includes a first lens 111, a third lens 113, a fourth lens 114, a fifth lens 115, a sixth lens 116, a seventh lens 117, and a second lens 112 in sequence from the object side to the image side. The first lens 111 is an aspheric lens with a positive focal power. The third lens 113 has a negative focal power. The fourth lens 114 has a positive focal power. The fifth lens 115 has a positive focal power. The sixth lens 116 has a negative focal power. The seventh lens 117 has a positive focal power, and the second lens 112 is an aspheric lens with a negative focal power.

As illustrated in FIG. 9, in this embodiment, the second lens group 12 includes one eighth lens 121 with a negative focal power.

In this embodiment, in the process of focusing from the infinite distance to the closer distance, the first lens group 11 moves towards the object side along the optical axis 14, and the second lens group 12 moves towards the object side. The air gap between the first lens group 11 and the second lens group 12 when focused at the closer distance is greater than the air gap between the first lens group 11 and the second lens group 12 when focused at the infinite distance. That is, the air gap between the first lens group 11 and the second lens group 12 may be increased.

In this embodiment, Fno is 2.67, and the focal length of the photographing lens system 100 is 8.8. The focal length f1 of the first lens group 11 is 7.93, and the focal length f2 of the second lens group 12 is −15.46. The value of f1/f is 0.9, the value of TTL/IH is 1.45, the value of fL1/f is 0.85, the value of d/f1 is 0.01, the value of |fL2/f2| is 3.54, the value of Vd1/Nd1 is 36.2, and the value of TTL/f is 1.18.

In this embodiment, the structural data of the photographing lens system 100 is illustrated in Table 9, the aspheric data is illustrated in Table 10, and the focal length data of each lens is illustrated in Table 11. The meanings of the letters in Tables 9 to 11 are the same with those in Tables 1 to 3, which will not be repeated herein.

TABLE 9

| Num | R' | thi | Nd | Vd | radius |
|---|---|---|---|---|---|
| 1(STO) | plane | −0.22 | | | |
| 2 | 4.799 | 0.72 | 1.544 | 56.0 | 1.7 |
| 3 | −26.123 | 0.10 | | | |
| 4 | 4.493 | 0.39 | 1.671 | 19.2 | 1.5 |
| 5 | 3.126 | 0.41 | | | |
| 6 | −181.853 | 0.45 | 1.544 | 56.0 | 1.6 |
| 7 | −53.529 | 0.48 | | | |
| 8 | −21.242 | 0.80 | 1.544 | 56.0 | 2.0 |
| 9 | −7.882 | 1.15 | | | |
| 10 | −2.507 | 0.36 | 1.650 | 21.5 | 2.4 |
| 11 | −3.160 | 0.10 | | | |
| 12 | −4.703 | 0.52 | 1.535 | 55.7 | 2.7 |
| 13 | −3.216 | 0.10 | | | |
| 14 | 3.404 | 0.97 | 1.535 | 55.7 | 4.3 |
| 15 | 2.748 | d15 | | | |
| 16 | −23.450 | 0.45 | 1.535 | 55.7 | 5.6 |
| 17 | 12.951 | d17 | | | |
| 18 | plane | 0.21 | 1.516 | 64.2 | 7.0 |
| 19 | plane | 0.59 | | | |
| 20 | image plane | — | | | |

TABLE 10

| Num | Num | K | A3 | A4 | A5 | A6 |
|---|---|---|---|---|---|---|
| 2 | 2* | −3.41826E+00 | | 1.08571E−05 | | −2.00232E−03 |
| 3 | 3* | 8.28845E+01 | | −4.10975E−03 | | 6.89457E−04 |
| 4 | 4* | 1.46563E+00 | | −1.35651E−02 | | 2.29377E−03 |
| 5 | 5* | 5.92109E−01 | | −1.69495E−02 | | 9.99071E−04 |
| 6 | 6* | −9.90000E+01 | | −7.70084E−03 | | 1.54492E−03 |
| 7 | 7* | −9.90000E+01 | | −1.51030E−02 | | 2.52793E−03 |
| 8 | 8* | 4.43332E+01 | | −1.56814E−02 | | −7.52567E−05 |
| 9 | 9* | 1.09245E+01 | | −7.54304E−03 | | −6.55550E−04 |
| 10 | 10* | −5.39636E−01 | 1.73688E−03 | 9.87087E−04 | 7.39721E−05 | −2.64399E−05 |
| 11 | 11* | −2.85144E+00 | −1.09450E−03 | −1.56582E−03 | 2.44875E−04 | −1.65387E−05 |
| 12 | 12* | −1.70566E+01 | −5.03351E−03 | 1.52463E−03 | 1.16790E−04 | −9.80556E−05 |
| 13 | 13* | −8.04411E+00 | −1.39593E−02 | 4.87713E−03 | 1.90211E−04 | −6.68276E−05 |
| 14 | 14* | −9.01395E−01 | −1.20529E−02 | −1.05934E−03 | 7.59084E−05 | 3.52576E−05 |
| 15 | 15* | −6.16378E+00 | 5.70900E−04 | −2.64516E−03 | 4.49069E−04 | −2.13997E−05 |
| 16 | 16* | −4.12094E+00 | | 3.84593E−04 | | −7.89927E−05 |
| 17 | 17* | −9.90000E+01 | | −1.85238E−03 | | 3.85820E−05 |

| Num | A7 | A8 | A9 | A10 | A11 | A12 |
|---|---|---|---|---|---|---|
| 2 | | 1.03590E−03 | | −7.80509E−04 | | 2.22001E−04 |
| 3 | | −1.29162E−03 | | 3.09786E−04 | | −3.45373E−05 |
| 4 | | −1.31978E−03 | | 1.97775E−04 | | 4.33935E−05 |
| 5 | | −5.54112E−04 | | −4.81234E−05 | | 2.33114E−06 |
| 6 | | 2.19555E−04 | | −5.87679E−05 | | |
| 7 | | 1.35139E−04 | | 6.16736E−05 | | |
| 8 | | 4.90521E−04 | | −4.98120E−05 | | −4.10689E−06 |
| 9 | | 1.35813E−04 | | −5.41996E−06 | | −6.32175E−06 |
| 10 | −9.06572E−06 | 8.96198E−06 | −7.61759E−07 | −3.81447E−07 | −4.95989E−08 | −2.70815E−08 |
| 11 | −4.75146E−06 | 5.39559E−06 | −2.32207E−07 | −1.25670E−07 | −1.25252E−08 | −5.76537E−09 |
| 12 | −7.61127E−06 | 1.21454E−06 | −7.81405E−07 | −1.54809E−07 | 1.53732E−08 | 6.46723E−09 |
| 13 | −1.70130E−05 | −2.76846E−06 | −6.38392E−09 | 5.61265E−08 | 8.89486E−09 | 1.37884E−09 |
| 14 | −3.90225E−07 | −4.35364E−07 | 3.28847E−10 | 1.20853E−09 | −7.41946E−11 | 1.31866E−11 |
| 15 | −2.46229E−06 | −2.07828E−08 | 2.48197E−08 | 1.56644E−09 | 6.54944E−12 | −8.65850E−12 |
| 16 | | 5.63253E−07 | | 4.12204E−08 | | 2.45471E−10 |
| 17 | | 1.56673E−07 | | −1.92772E−08 | | −7.14445E−10 |

| Num | A13 | A14 | A15 | A16 | A17 | A18 |
|---|---|---|---|---|---|---|
| 2 | | −2.89583E−05 | | | | |
| 3 | | −3.13416E−06 | | | | |
| 4 | | −1.72635E−05 | | 1.13791E−06 | | |
| 5 | | 9.82380E−06 | | −2.42597E−06 | | |
| 6 | | | | | | |
| 7 | | | | | | |
| 8 | | 2.72668E−06 | | −5.47275E−07 | | |
| 9 | | 5.21120E−07 | | −1.85515E−08 | | |
| 10 | 5.53894E−10 | 5.93847E−10 | 2.40932E−10 | 5.40438E−11 | −2.70049E−12 | −5.09955E−12 |
| 11 | −9.50498E−10 | −1.26469E−10 | −8.15120E−12 | 7.73726E−12 | 4.72308E−12 | 1.39016E−12 |
| 12 | 8.23295E−10 | −7.72594E−11 | −7.50917E−11 | −2.06931E−11 | −2.33928E−12 | 8.37928E−13 |
| 13 | 1.99441E−10 | 1.83695E−11 | −6.71998E−13 | −5.91625E−13 | −1.85510E−13 | −4.56180E−14 |

TABLE 10-continued

| | | | | | |
|---|---|---|---|---|---|
| 14 | −2.22622E−13 | 9.62483E−15 | 1.71640E−14 | 9.75353E−16 | 1.76304E−16 | 2.04054E−17 |
| 15 | −6.47675E−13 | 5.21463E−14 | 3.00945E−15 | 1.23949E−15 | 5.94842E−17 | −1.97177E−17 |
| 16 | | −1.75498E−11 | | | | |
| 17 | | 1.80163E−11 | | | | |

TABLE 11

| Element | Start surface | Focal length |
|---|---|---|
| 1 | 2 | 7.51 |
| 2 | 4 | −17.30 |
| 3 | 6 | 139.27 |
| 4 | 8 | 22.56 |
| 5 | 10 | −23.79 |
| 6 | 12 | 16.94 |
| 7 | 14 | −54.83 |
| 8 | 16 | −15.53 |

In this embodiment, when the distance of the object to be photographed is the infinite distance (INF) or the closer distance (300 mm), the data of d15 and d17 is illustrated in Table 12.

TABLE 12

| | infinite distance | closer distance |
|---|---|---|
| distance of object to be photographed | INF | 300 mm |
| d15 | 1.72 | 1.76 |
| d17 | 0.85 | 1.04 |

As can be seen from Table 12, d15 is 1.72 and d17 is 0.85 when the distance of the object to be photographed is the infinite distance (INF), and d15 is 1.76 and d17 is 1.04 when the distance of the object to be photographed is the closer distance (300 mm).

Figure 10:
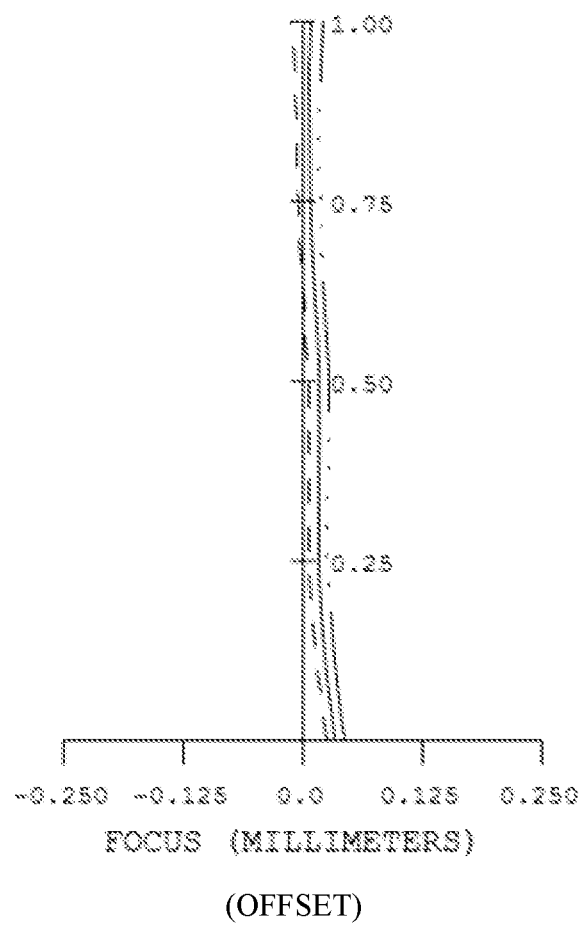
FIG. 10 is a spherical aberration curve diagram according to another illustrative embodiment of the present disclosure.
Figure 11:
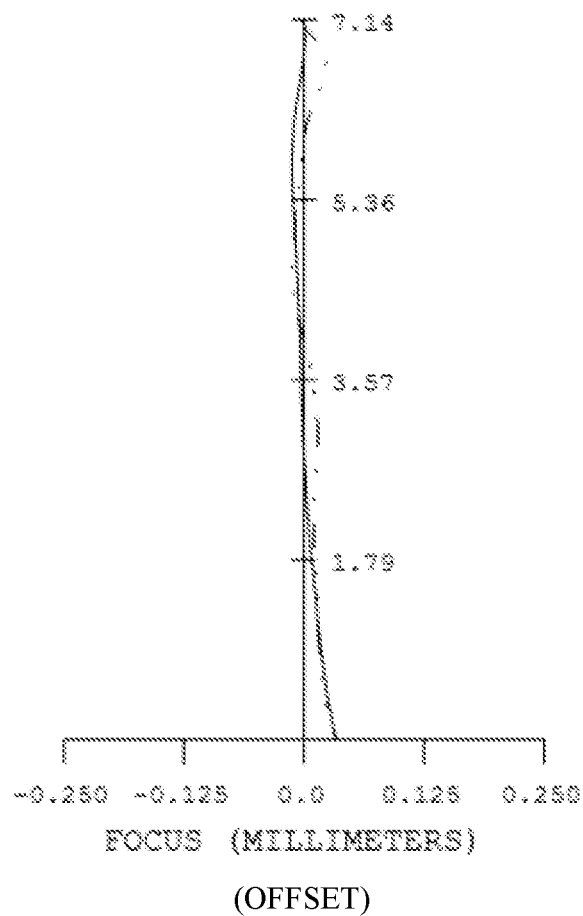
FIG. 11 is a diagram of astigmatic field curves according to another illustrative embodiment of the present disclosure.
Figure 12:
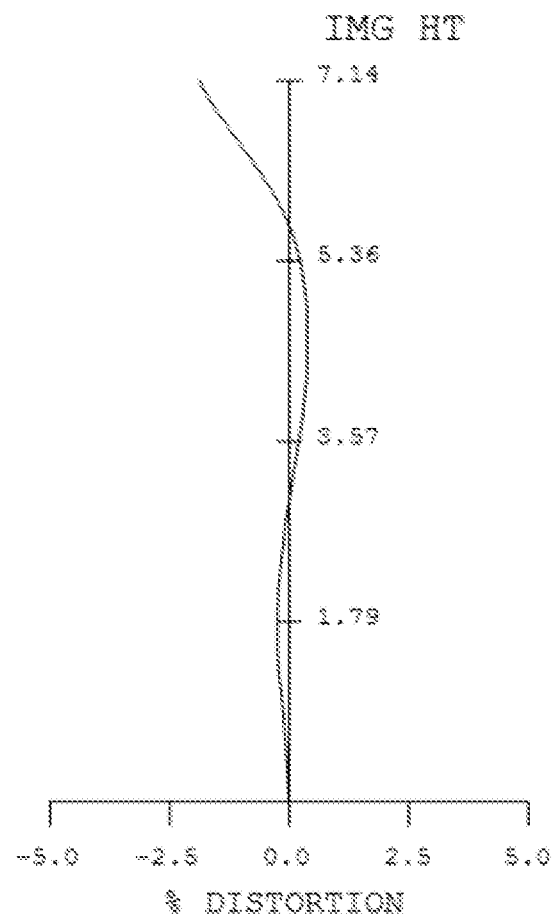
FIG. 12 is a distortion curve diagram according to another illustrative embodiment of the present disclosure.

In this embodiment, a spherical aberration curve diagram of the photographing lens system 100 is illustrated in FIG. 10, a diagram of astigmatic field curves is illustrated in FIG. 11, and a distortion curve diagram is illustrated in FIG. 12. FIG. 10 shows a spherical aberration curve of an incident light with a wavelength of 656.3000 NM, a spherical aberration curve of an incident light with a wavelength of 587.6000 NM, and a spherical aberration curve of an incident light with a wavelength of 486.0000 NM. FIG. 11 shows a curve T of a meridianal field curve of an incident light with a wavelength of 587.6000 NM and a curve S of a sagittal field curve of the incident light with the wavelength of 587.6000 NM.

In this embodiment, an overall image quality of the photographing lens system 100 may be greatly improved and the imaging range may be expanded. When the electronic zoom is performed, a better image quality and a better close-distance effect may be obtained.

Figure 13:
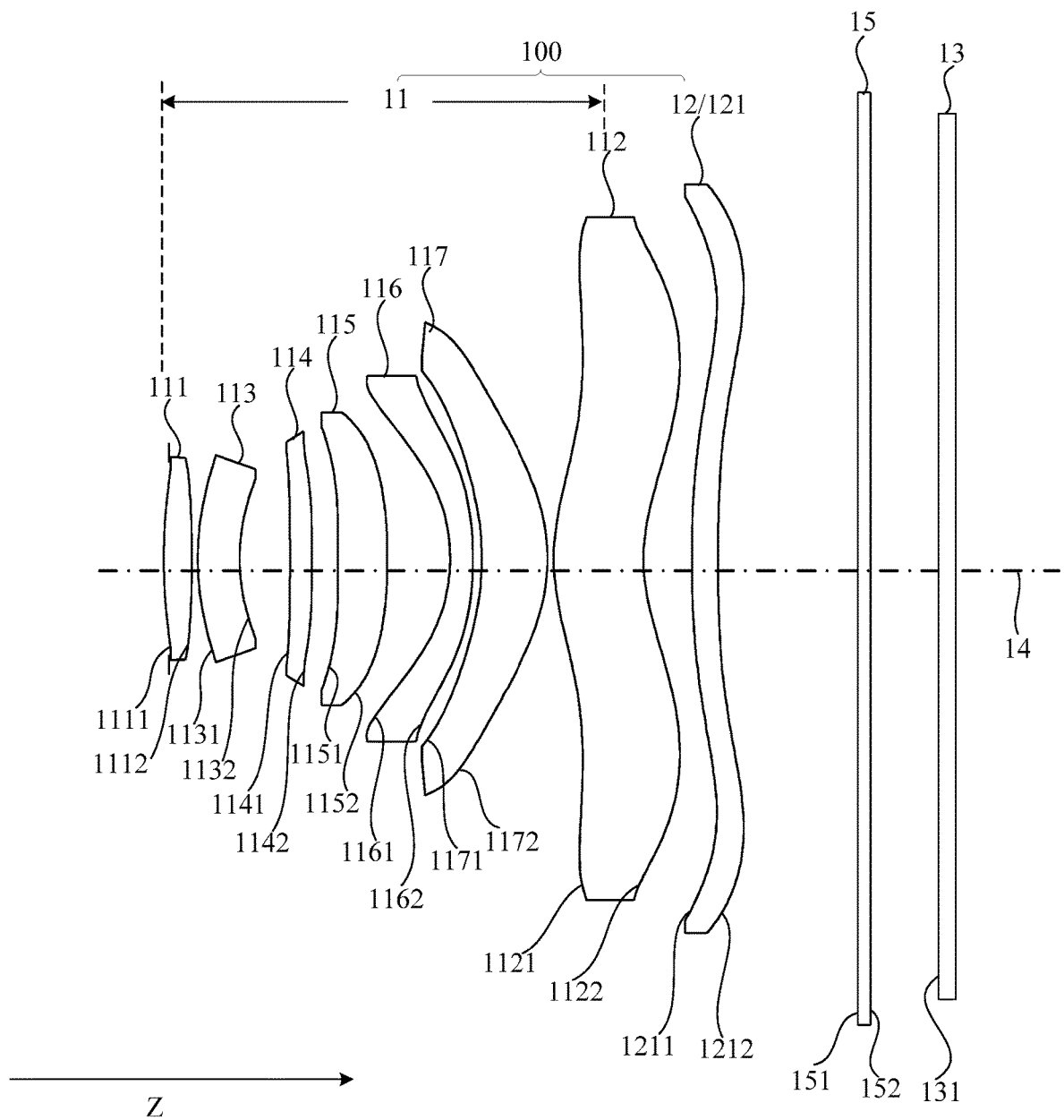
FIG. 13 is a schematic view of a photographing lens system according to another illustrative embodiment of the present disclosure.

FIG. 13 is a schematic view of a photographing lens system 100 according to another illustrative embodiment. In this embodiment, the first lens group 11 includes seven lenses, and the second lens group 12 includes one lens.

As illustrated in FIG. 13, in this embodiment, the first lens group 11 includes a first lens 111, a third lens 113, a fourth lens 114, a fifth lens 115, a sixth lens 116, a seventh lens 117 and a second lens 112 in sequence from the object side to the image side. The first lens 111 is an aspheric lens with a positive focal power. The third lens 113 has a negative focal power. The fourth lens 114 has a positive focal power. The fifth lens 115 has a positive focal power. The sixth lens 116 has a negative focal power. The seventh lens 117 has a positive focal power, and the second lens 112 is an aspheric lens with a positive focal power.

As illustrated in FIG. 13, in this embodiment, the second lens group 12 includes one eighth lens 121 with a positive focal power.

In this embodiment, in the process of focusing from the infinite distance to the closer distance, the first lens group 11 moves towards the object side along the optical axis 14, the position of the second lens group 12 is fixed, and the air gap between the first lens group 11 and the second lens group 12 gradually increases.

In this embodiment, Fno is 2.87, and the focal length of the photographing lens system 100 is 8.8. The focal length f1 of the first lens group 11 is 9.25, and the focal length f2 of the second lens group 12 is 73.95. The value of f1/f is 1.05, the value of TTL/IH is 1.73, the value of fL1/f is 1.11, the value of d/f1 is 0.03, the value of |fL2/f2| is 0.60, the value of Vd1/Nd1 is 35.8, and the value of TTL/f is 1.41.

In this embodiment, the structural data of the photographing lens system 100 is illustrated in Table 13, the aspheric data is illustrated in Table 14, and the focal length data of each lens is illustrated in Table 15. The meanings of the letters in Tables 13 to 15 are the same with those in Tables 1 to 3, which will not be repeated herein.

TABLE 13

| Num | R' | thi | Nd | Vd | radius |
|---|---|---|---|---|---|
| 1(STO) | plane | −0.11 | | | |
| 2 | 8.268 | 0.47 | 1.623 | 58.2 | 1.5 |
| 3 | −22.951 | 0.10 | | | |
| 4 | 4.424 | 0.70 | 1.650 | 21.5 | 1.6 |
| 5 | 3.072 | 0.85 | | | |
| 6 | −2000.000 | 0.37 | 1.544 | 56.0 | 1.8 |
| 7 | −41.001 | 0.43 | | | |
| 8 | −93.161 | 0.82 | 1.544 | 56.0 | 2.2 |
| 9 | −9.079 | 1.05 | | | |
| 10 | −2.979 | 0.38 | 1.635 | 24.0 | 2.7 |
| 11 | −7.244 | 0.15 | | | |
| 12 | −4.584 | 1.10 | 1.768 | 49.2 | 3.1 |
| 13 | −3.386 | 0.10 | | | |
| 14 | 3.223 | 1.50 | 1.535 | 55.7 | 5.3 |
| 15 | 3.120 | d15 | | | |
| 16 | 19.811 | 0.44 | 1.535 | 55.7 | 6.1 |
| 17 | 39.207 | 2.34 | | | |
| 18 | plane | 0.21 | 1.516 | 64.2 | 7.0 |
| 19 | plane | 0.56 | | | |
| 20 | image plane | — | | | |

TABLE 14

| Num | K | A3 | A4 | A5 | A6 |
|---|---|---|---|---|---|
| 2 | −7.98364E+00 | | −1.03509E−05 | | −1.89234E−03 |
| 3 | −6.13094E+00 | | −1.47257E−03 | | 7.20029E−04 |

TABLE 14-continued

| Num | | | | | |
|---|---|---|---|---|---|
| 4 | 2.77647E+00 | | −1.16425E−02 | | 2.10734E−03 |
| 5 | 9.75634E−01 | | −1.77280E−02 | | 1.03884E−03 |
| 6 | 9.90000E+01 | | −9.18155E−03 | | 1.29091E−03 |
| 7 | −3.41775E+01 | | −1.70896E−02 | | 2.13297E−03 |
| 8 | 9.90000E+01 | | −1.52202E−02 | | −8.14208E−05 |
| 9 | 8.97071E+00 | | −6.90825E−03 | | −5.60562E−04 |
| 10 | −1.53349E−01 | −1.89798E−04 | −1.75534E−03 | −4.34986E−05 | 5.12940E−05 |
| 11 | −1.45471E+00 | −4.81388E−03 | −1.88477E−03 | 2.63304E−04 | 3.94634E−06 |
| 12 | −1.10875E+01 | −5.48185E−03 | 1.15694E−03 | 8.08907E−05 | −8.37319E−05 |
| 13 | −4.27088E+00 | −6.27663E−03 | 3.83527E−04 | 9.90436E−05 | 1.96679E−05 |
| 14 | −9.86406E−01 | −6.37374E−03 | −1.43800E−03 | 3.12116E−05 | 3.47055E−05 |
| 15 | −4.74331E+00 | 2.94706E−03 | −3.02671E−03 | 4.65472E−04 | −1.72203E−05 |
| 16 | −9.66057E+00 | | 1.44448E−03 | | −8.39550E−05 |
| 17 | −6.96237E+01 | | 2.76468E−03 | | −1.49318E−04 |

| Num | A7 | A8 | A9 | A10 | A11 | A12 |
|---|---|---|---|---|---|---|
| 2 | | 1.14511E−03 | | −7.97234E−04 | | 2.22275E−04 |
| 3 | | −1.22220E−03 | | 2.87797E−04 | | −3.55795E−05 |
| 4 | | −1.32195E−03 | | 2.04009E−04 | | 4.15614E−05 |
| 5 | | −5.46822E−04 | | −4.59474E−05 | | 2.31112E−06 |
| 6 | | 1.86702E−04 | | −6.76655E−05 | | |
| 7 | | 2.84183E−04 | | −3.55354E−05 | | |
| 8 | | 4.54585E−04 | | −5.93743E−05 | | −4.84612E−06 |
| 9 | | 1.51413E−04 | | −4.49255E−06 | | −5.52018E−06 |
| 10 | 1.69615E−05 | 1.43237E−05 | 5.26502E−08 | −3.13449E−07 | −5.87416E−08 | −3.24114E−08 |
| 11 | −6.66472E−07 | 5.86648E−06 | −1.67602E−07 | −1.06656E−07 | −3.67590E−09 | −2.58888E−09 |
| 12 | 1.03502E−06 | 4.25502E−06 | −2.44461E−07 | −1.29580E−07 | −1.04820E−09 | 1.28832E−09 |
| 13 | 6.77534E−07 | −1.18896E−06 | −2.27772E−07 | −6.35607E−08 | −6.35607E−10 | −1.86460E−10 |
| 14 | −1.41711E−07 | −3.97436E−07 | 4.03233E−09 | 1.47772E−09 | −6.60079E−11 | 1.21094E−11 |
| 15 | −2.08527E−06 | −7.80335E−09 | 2.28503E−08 | 1.07608E−09 | −6.11846E−11 | −1.54885E−11 |
| 16 | | −5.01994E−07 | | 3.73503E−08 | | 2.55942E−10 |
| 17 | | 1.73204E−06 | | 1.13438E−08 | | −1.43770E−10 |

| Num | A13 | A14 | A15 | A16 | A17 | A18 |
|---|---|---|---|---|---|---|
| 2 | | −2.71081E−05 | | 0.00000E+00 | | |
| 3 | | −7.71624E−07 | | 0.00000E+00 | | |
| 4 | | −1.99158E−05 | | 2.00291E−06 | | |
| 5 | | 9.62554E−06 | | −2.26772E−06 | | |
| 6 | | | | | | |
| 7 | | | | | | |
| 8 | | 2.39087E−06 | | −2.01297E−07 | | |
| 9 | | 5.51610E−07 | | −1.01187E−08 | | |
| 10 | −9.34787E−10 | 3.22219E−10 | 2.26872E−10 | 6.19343E−11 | 3.26649E−12 | −2.68147E−12 |
| 11 | −1.62121E−10 | 2.28023E−11 | 5.99337E−12 | 3.40331E−12 | 1.03814E−12 | −2.13394E−13 |
| 12 | 2.26253E−10 | 3.36201E−11 | 2.42389E−12 | −4.80801E−13 | −1.70772E−13 | −2.05937E−14 |
| 13 | −2.44602E−12 | 3.51693E−12 | 1.21497E−12 | 2.46187E−13 | 1.18966E−14 | −1.43724E−14 |
| 14 | −6.63666E−13 | −4.29066E−14 | 9.48667E−15 | −7.95358E−17 | 2.32917E−17 | −5.56274E−18 |
| 15 | −1.17015E−12 | 2.64722E−14 | 3.59846E−15 | 1.57383E−15 | 1.10172E−16 | −1.49659E−17 |
| 16 | | −1.01008E−11 | | | | |
| 17 | | −3.12316E−12 | | | | |

TABLE 15

| Element | Start surface | Focal length |
|---|---|---|
| 1 | 2 | 9.78 |
| 2 | 4 | −19.22 |
| 3 | 6 | 76.98 |
| 4 | 8 | 18.35 |
| 5 | 10 | −8.18 |
| 6 | 12 | 11.99 |
| 7 | 14 | 44.42 |
| 8 | 16 | 73.95 |

In this embodiment, when the distance of the object to be photographed is the infinite distance (INF) or the closer distance (300 mm), the data of d15 is illustrated in Table 16.

TABLE 16

| | infinite distance | closer distance |
|---|---|---|
| distance of object to be photographed | INF | 300 mm |
| d15 | 0.81 | 1.08 |

It can be seen from Table 16 that d15 is 0.81 when the distance of the object to be photographed is the infinite distance (INF), and d15 is 1.08 when the distance of the object to be photographed is the closer distance (300 mm).

Figure 14:
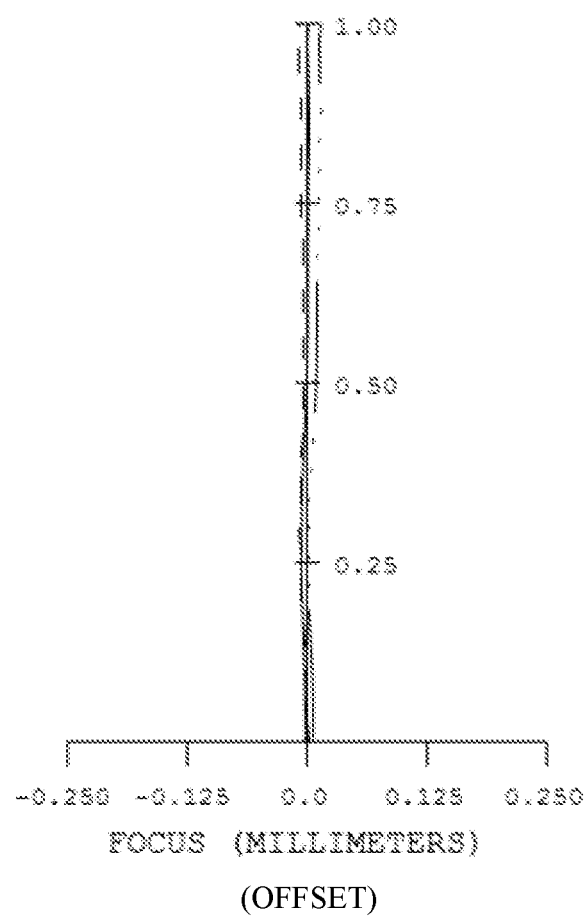
FIG. 14 is a spherical aberration curve diagram according to another illustrative embodiment of the present disclosure.
Figure 15:
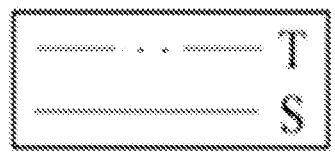
FIG. 15 is a diagram of astigmatic field curves according to another illustrative embodiment of the present disclosure.
Figure 15:
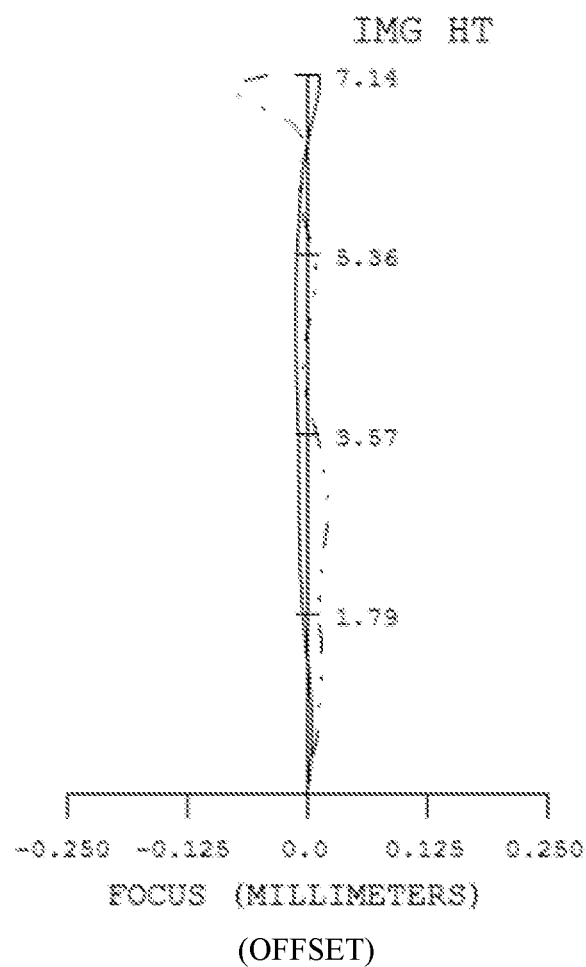
Figure 16:
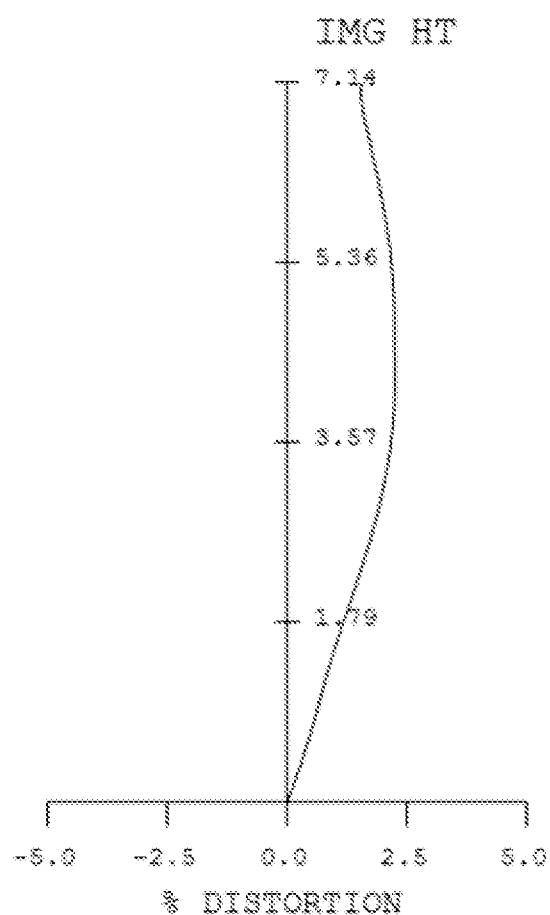
FIG. 16 is a distortion curve diagram according to another illustrative embodiment of the present disclosure.

In this embodiment, a spherical aberration curve diagram of the photographing lens system 100 is illustrated in FIG. 14, a diagram of astigmatic field curves is illustrated in FIG. 15, and a distortion curve diagram is illustrated in FIG. 16. FIG. 14 shows a spherical aberration curve of an incident light with a wavelength of 656.3000 NM, a spherical aberration curve of an incident light with a wavelength of 587.6000 NM and a spherical aberration curve of an incident light with a wavelength of 486.0000 NM. FIG. 15 shows a curve T of a meridianal field curve of an incident light with a wavelength of 587.6000 NM and a curve S of a sagittal field curve of the incident light with the wavelength of 587.6000 NM.

In this embodiment, an overall image quality of the photographing lens system 100 may be greatly improved and the imaging range may be expanded. When the electronic zoom is performed, a better image quality and a better close-distance effect may be obtained.

Figure 17:
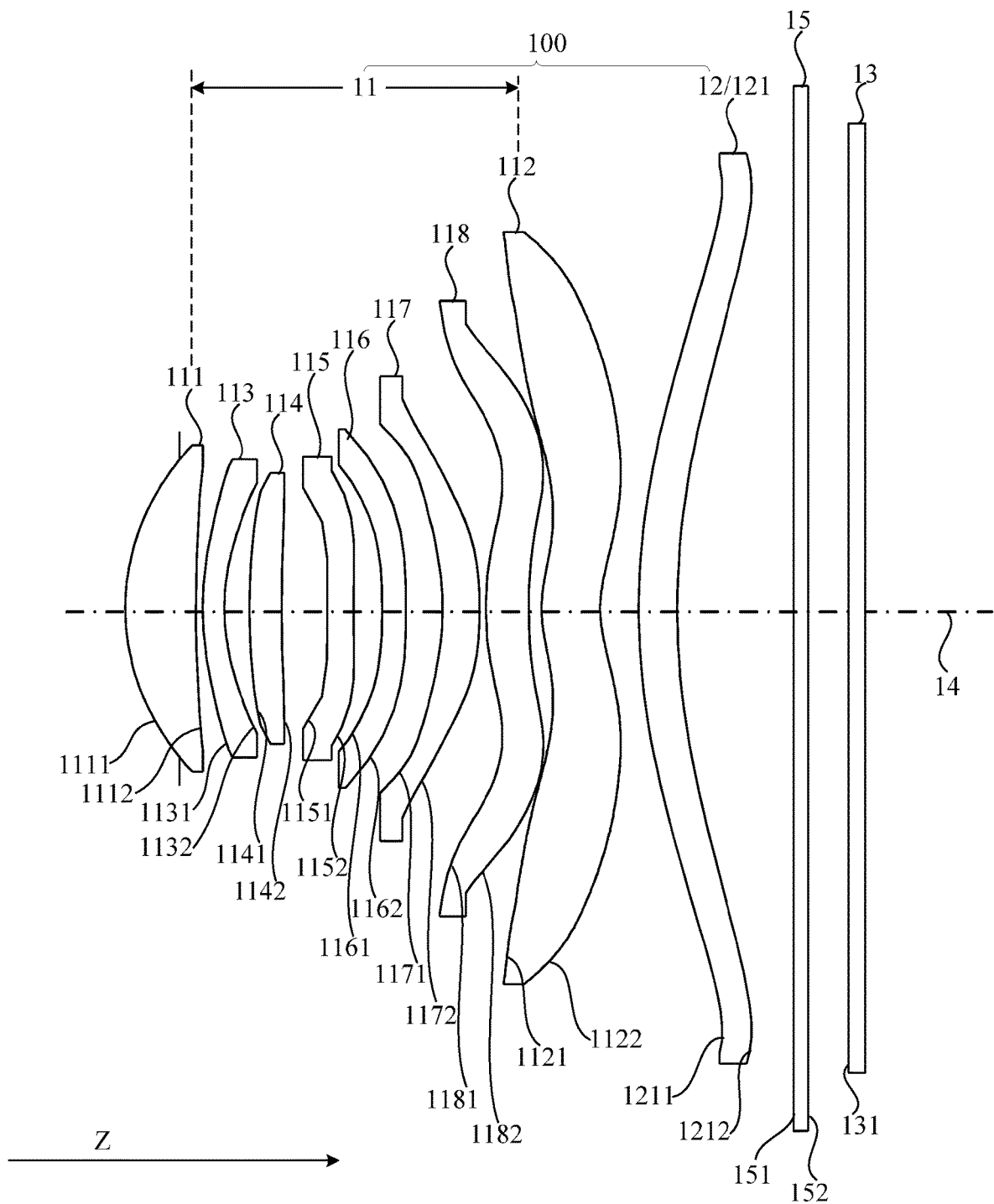
FIG. 17 is a schematic view of a photographing lens system according to another illustrative embodiment of the present disclosure.

FIG. 17 is a schematic view of a photographing lens system 100 according to another illustrative embodiment. In this embodiment, the first lens group 11 includes eight lenses, and the second lens group 12 includes one lens.

As illustrated in FIG. 17, in this embodiment, the first lens group 11 includes a first lens 111, a third lens 113, a fourth lens 114, a fifth lens 115, a sixth lens 116, a seventh lens 117, a ninth lens 118, and a second lens 112 in sequence from the object side to the image side. The first lens 111 is an aspheric lens with a positive focal power. The third lens 113 has a negative focal power. The fourth lens 114 has a positive focal power. The fifth lens 115 has a negative focal power. The sixth lens 116 has a negative focal power. The seventh lens 117 has a negative focal power, the ninth lens 118 has a positive focal power, and the second lens 112 is an aspheric lens with a positive focal power.

In this embodiment, the ninth lens 118 includes a twentieth surface 1181 facing the object side and a twenty-first surface 1182 facing the image side.

As illustrated in FIG. 17, in this embodiment, the second lens group 12 includes one eighth lens 121 with a positive focal power.

In this embodiment, in the process of focusing from the infinite distance to the closer distance, the first lens group 11 moves towards the object side along the optical axis 14, the second lens group 12 moves towards the image side, and the air gap between the first lens group 11 and the second lens group 12 gradually increases.

In this embodiment, Fno is 2.08, and the focal length of the photographing lens system 100 is 9.0. The focal length f1 of the first lens group 11 is 9.29, and the focal length f2 of the second lens group 12 is 196.88. The value of f1/f is 1.03, the value of TTL/IH is 1.46, the value of fL1/F is 0.80, the value of d/f1 is 0.14, the value of |fL2/f2| is 0.17, the value of Vd1/Nd1 is 36.3, and the value of TTL/f is 1.16.

In this embodiment, the structural data of the photographing lens system 100 is illustrated in Table 17, the aspheric data is illustrated in Table 18, and the focal length data of each lens is illustrated in Table 19.

TABLE 17

| Num | R' | thi | Nd | Vd | radius |
|---|---|---|---|---|---|
| 1(STO) | plane | −0.78 | | | |
| 2 | 3.337 | 1.02 | 1.542 | 56.0 | 2.2 |

TABLE 17-continued

| Num | R' | thi | Nd | Vd | radius |
|---|---|---|---|---|---|
| 3 | 20.336 | 0.10 | | | |
| 4 | 4.342 | 0.31 | 1.667 | 19.2 | 2.0 |
| 5 | 3.101 | 0.38 | | | |
| 6 | 11.900 | 0.46 | 1.542 | 56.0 | 1.8 |
| 7 | 18.098 | 0.66 | | | |
| 8 | 52.452 | 0.39 | 1.542 | 56.0 | 1.8 |
| 9 | 15.360 | 0.41 | | | |
| 10 | −11.280 | 0.35 | 1.667 | 19.2 | 2.1 |
| 11 | −16.821 | 0.52 | | | |
| 12 | −5.321 | 0.54 | 1.566 | 37.4 | 2.7 |
| 13 | −9.880 | 0.10 | | | |
| 14 | 5.169 | 0.62 | 1.534 | 55.7 | 3.9 |
| 15 | 9.173 | 0.19 | | | |
| 16 | 1.988 | 0.85 | 1.534 | 55.7 | 4.7 |
| 17 | 1.904 | d17 | | | |
| 18 | 9.951 | 0.56 | 1.534 | 55.7 | 6.5 |
| 19 | 10.770 | d19 | | | |
| 20 | plane | 0.21 | 1.516 | 64.2 | 7.0 |
| 21 | plane | 0.50 | | | |
| 22 | image plane | — | | | |

In Table 17, similar to the above embodiments, in this embodiment, surface one is the seventeenth surface of the aperture diaphragm (STO), surface two is the first surface 1111 of the first lens 111, surface three is the second surface 1112 of the first lens 111, surface four is the third surface 1131 of the third lens 113, surface five is the fourth surface 1132 of the third lens 113, surface six is the fifth surface 1141 of the fourth lens 114, surface seven is the sixth surface 1142 of the fourth lens 114, surface eight is the seventh surface 1151 of the fifth lens 115, surface nine is the eighth surface 1152 of the fifth lens 115, surface ten is the ninth surface 1161 of the sixth lens 116, surface eleven is the tenth surface 1162 of the sixth lens 116, surface twelve is the eleventh surface 1171 of the seventh lens 117, and surface thirteen is the twelfth surface 1172 of the seventh lens 117.

Different from the above embodiments, in this embodiment, surface fourteen is the twentieth surface 1181 of the ninth lens 118, surface fifteen is the twenty-first surface 1182 of the ninth lens 118, surface sixteen is the thirteenth surface 1121 of the second lens 112, surface seventeen is the fourteenth surface 1122 of the second lens 112, surface eighteen is the fifteenth surface 1211 of the eighth lens 121, surface nineteen is the sixteenth surface 1212 of the eighth lens 121, surface twenty is the eighteenth surface 151 of the filter element 15 facing the object side, surface twenty one is the nineteenth surface 152 of the filter element 15 facing the image side, and surface twenty two is the image plane 131.

In this embodiment, d17 is the air gap between the surface seventeen and the surface eighteen, that is, the air gap between the first lens group 11 and the second lens group 12, and d19 is the air gap between the surface nineteen and the surface twenty, that is, the air gap between the second lens group 12 and the eighteenth surface 151.

TABLE 18

| Num | K | A4 | A6 | A8 | A10 |
|---|---|---|---|---|---|
| 2 | 0.00000E+00 | −4.84795E−04 | 7.76784E−04 | −4.36387E−04 | 6.66534E−05 |
| 3 | 0.00000E+00 | −4.05878E−03 | 9.92681E−03 | −1.18239E−02 | 7.37601E−03 |
| 4 | −7.18470E−01 | −1.56462E−02 | 1.79159E−02 | −2.39364E−02 | 1.75604E−02 |
| 5 | −1.30232E−01 | −1.29811E−02 | 9.39117E−03 | −1.26321E−02 | 8.55054E−03 |
| 6 | 2.66027E+00 | −2.21035E−04 | 1.48396E−03 | 6.18120E−03 | −1.31633E−02 |
| 7 | −2.71262E+01 | −6.78585E−03 | 4.73205E−03 | −4.80027E−03 | 3.08224E−03 |
| 8 | −79.3152 | −0.03703835 | 0.008753212 | −0.01113056 | 0.009595714 |
| 9 | −7.124521036 | −0.035654504 | −0.015199937 | 0.089091664 | −0.197584055 |
| 10 | −0.078361236 | −0.049773889 | 0.009323083 | 0.052006425 | −0.150821916 |

TABLE 18-continued

| | | | | | |
|---|---|---|---|---|---|
| 11 | 13.79313 | −0.05633645 | 0.05335295 | −0.04373659 | 0.02300393 |
| 12 | −0.521545626 | −0.077830663 | 0.13446567 | −0.136771427 | 0.100362169 |
| 13 | −3.351622711 | −0.127242682 | 0.134266441 | −0.121157308 | 0.078583129 |
| 14 | −12.48757834 | 0.046052448 | −0.038936432 | 0.017398254 | −0.005846171 |
| 15 | 0.034266185 | 0.025037611 | −0.009693793 | 0.000242749 | 0.000472076 |
| 16 | −0.995734756 | −0.151309084 | 0.051990462 | −0.012849667 | 0.002211922 |
| 17 | −1.011493196 | −0.114255013 | 0.03751601 | −0.009767382 | 0.001837667 |
| 18 | −5.804001 | 0.000137489 | 6.03883E−06 | −2.43512E−06 | 1.67339E−07 |
| 19 | −2.064018 | −0.000175238 | −8.14403E−06 | 2.25456E−07 | −2.74232E−08 |

| Num | A10 | A12 | A14 | A16 | A18 | A20 |
|---|---|---|---|---|---|---|
| 2 | 6.66534E−05 | 1.45108E−05 | −7.89128E−06 | 1.31692E−06 | −1.14492E−07 | 5.62353E−09 |
| 3 | 7.37601E−03 | −2.62648E−03 | 5.33414E−04 | −5.50932E−05 | 1.63304E−06 | 9.31910E−08 |
| 4 | 1.75604E−02 | −7.68868E−03 | 2.09970E−03 | −3.50785E−04 | 3.26720E−05 | −1.28660E−06 |
| 5 | 8.55054E−03 | −3.20501E−03 | 6.70559E−04 | −6.98788E−05 | 2.48433E−06 | 2.86214E−08 |
| 6 | −1.31633E−02 | 1.21483E−02 | −6.25393E−03 | 1.85511E−03 | −2.95240E−04 | 1.95669E−05 |
| 7 | 3.08224E−03 | −1.23098E−03 | 2.41126E−04 | −2.80981E−06 | −6.15428E−06 | 6.90220E−07 |
| 8 | 0.009595714 | −0.00593126 | 0.00227514 | −0.000527927 | 6.84987E−05 | −3.68519E−06 |
| 9 | −0.197584055 | 0.259075667 | −0.214208764 | 0.109172875 | −0.028627679 | −0.001237299 |
| 10 | −0.150821916 | 0.220744163 | −0.203870042 | 0.124624357 | −0.050257461 | 0.012682014 |
| 11 | 0.02300393 | −0.007918624 | 0.00178701 | −0.000253215 | 2.02799E−05 | −6.96244E−07 |
| 12 | 0.100362169 | −0.053225191 | 0.019874843 | −0.005032296 | 0.000785729 | −4.70392E−05 |
| 13 | 0.078583129 | −0.034107832 | 0.009653069 | −0.001684895 | 0.00014261 | 6.28504E−06 |
| 14 | −0.005846171 | 0.001417181 | −0.000241884 | 2.90821E−05 | −2.47065E−06 | 1.47544E−07 |
| 15 | 0.000472076 | −0.000145385 | 2.23817E−05 | −1.77059E−06 | 1.92874E−08 | 1.03941E−08 |
| 16 | 0.002211922 | −0.000260496 | 2.08759E−05 | −1.12032E−06 | 3.80238E−08 | −6.50329E−10 |
| 17 | 0.001837667 | −0.000239186 | 2.11435E−05 | −1.23852E−06 | 4.47097E−08 | −7.21771E−10 |
| 18 | 1.67339E−07 | −6.02643E−09 | 1.39659E−10 | −2.3448E−12 | 2.62414E−14 | −1.4194E−16 |
| 19 | −2.74232E−08 | 1.86805E−09 | −5.58414E−11 | 8.24741E−13 | −7.29453E−15 | 3.91128E−17 |

| Num | A20 | A22 | A24 | A26 | A28 | A30 |
|---|---|---|---|---|---|---|
| 2 | 5.62353E−09 | | | | | |
| 3 | 9.31910E−08 | | | | | |
| 4 | −1.28660E−06 | | | | | |
| 5 | 2.86214E−08 | | | | | |
| 6 | 1.95669E−05 | | | | | |
| 7 | 6.90220E−07 | | | | | |
| 8 | −3.68519E−06 | | | | | |
| 9 | −0.001237299 | 0.003858319 | −0.00142647 | 0.000267945 | −2.66553E−05 | 1.11691E−06 |
| 10 | 0.012682014 | −0.00162836 | −3.64144E−05 | 4.65192E−05 | −6.42601E−06 | 3.07467E−07 |
| 11 | −6.96244E−07 | | | | | |
| 12 | −4.70392E−05 | −8.42115E−06 | 2.37031E−06 | −2.63237E−07 | 1.49066E−08 | −3.53486E−10 |
| 13 | 6.28504E−06 | −3.24355E−06 | 4.03894E−07 | −2.64832E−08 | 9.29299E−10 | −1.37995E−11 |
| 14 | 1.47544E−07 | −6.06702E−09 | 1.63846E−10 | −2.62362E−12 | 1.90683E−14 | −4.56068E−18 |
| 15 | 1.03941E−08 | −1.11176E−09 | 5.81867E−11 | −1.74139E−12 | 2.85146E−14 | −1.98931E−16 |
| 16 | −6.50329E−10 | −3.94532E−12 | 4.83109E−13 | −1.11289E−14 | 1.20151E−16 | −5.24941E−19 |
| 17 | −7.21771E−10 | −1.29752E−11 | 9.85884E−13 | −2.32596E−14 | 2.67239E−16 | −1.25523E−18 |
| 18 | −1.4194E−16 | | | | | |
| 19 | 3.91128E−17 | | | | | |

TABLE 19

| Element | Start surface | Focal length |
|---|---|---|
| 1 | 2 | 7.17 |
| 2 | 4 | −17.87 |
| 3 | 6 | 62.09 |
| 4 | 8 | −39.98 |
| 5 | 10 | −51.92 |
| 6 | 12 | −21.14 |
| 7 | 14 | 20.94 |
| 8 | 16 | 33.05 |
| 9 | 18 | 196.88 |

In this embodiment, when the distance of the object to be photographed is the infinite distance (INF) or the closer distance (100 mm), the data of d17 and d19 is illustrated in Table 20.

TABLE 20

| | infinite distance | closer distance |
|---|---|---|
| distance of object to be photographed | INF | 100 mm |
| d17 | 0.56 | 1.83 |
| d19 | 1.70 | 1.50 |

As can be seen from Table 20, d17 is 0.56 and d19 is 1.70 when the distance of the object to be photographed is the infinite distance (INF), and d17 is 1.83 and d19 is 1.50 when the distance of the object to be photographed is the closer distance (100 mm).

Figure 18:
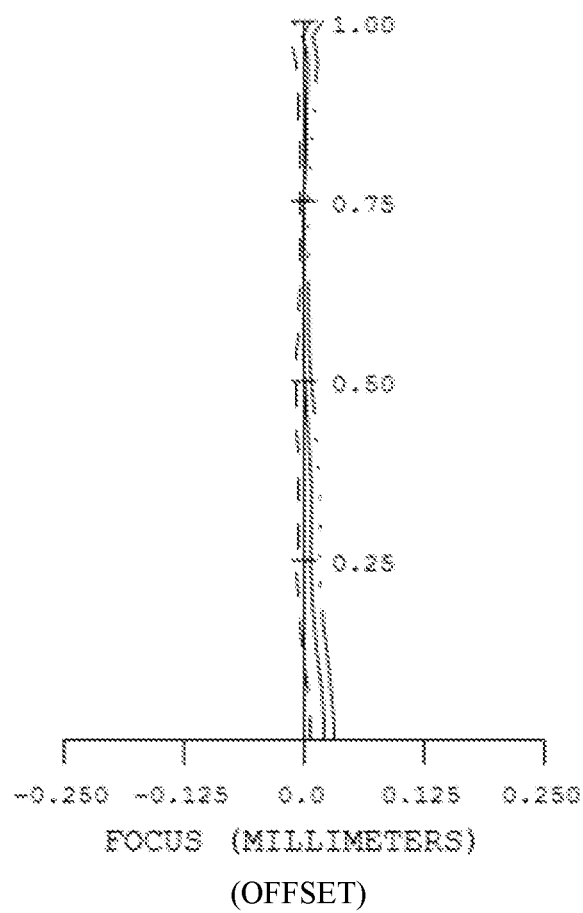
FIG. 18 is a spherical aberration curve diagram according to another illustrative embodiment of the present disclosure.
Figure 19:
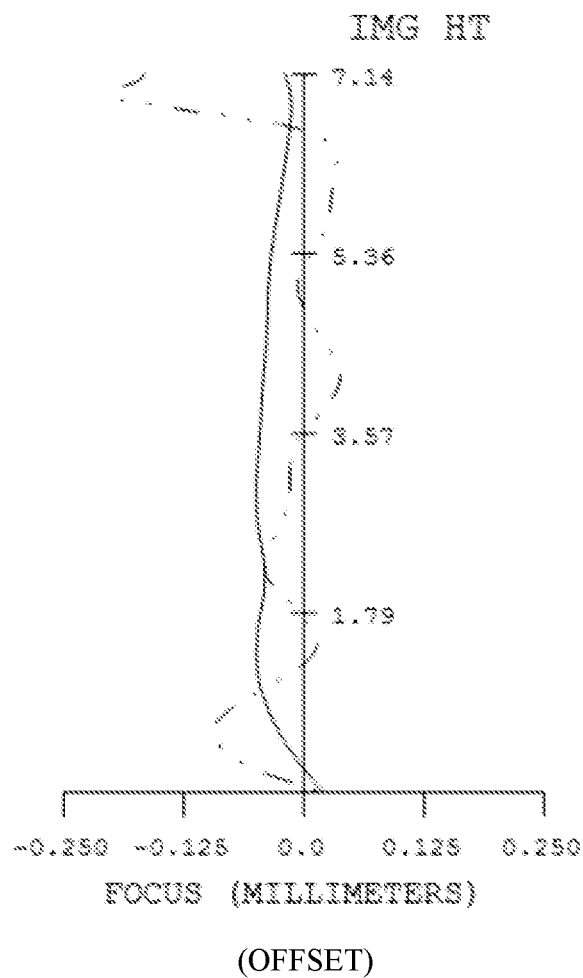
FIG. 19 is a diagram of astigmatic field curves according to another illustrative embodiment of the present disclosure.
Figure 20:
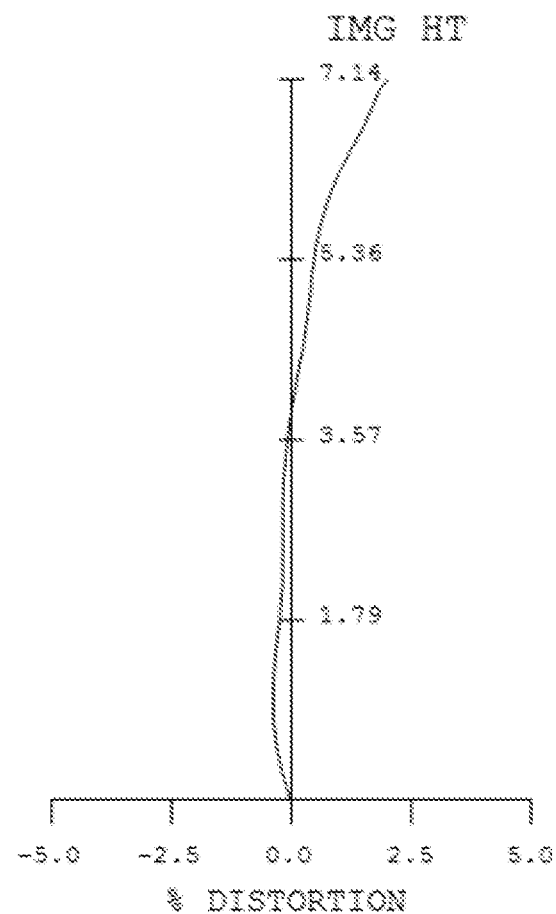
FIG. 20 is a distortion curve diagram according to another illustrative embodiment of the present disclosure.

In this embodiment, a spherical aberration curve diagram of the photographing lens system 100 is illustrated in FIG. 18, a diagram of astigmatic field curves is illustrated in FIG. 19, and a distortion curve diagram is illustrated in FIG. 20. FIG. 18 shows a spherical aberration curve of an incident light with a wavelength of 656.3000 NM, a spherical aberration curve of an incident light with a wavelength of 587.6000 NM and a spherical aberration curve of an incident light with a wavelength of 486.0000 NM. FIG. 19 shows a curve T of a meridianal field curve of an incident light with a wavelength of 587.6000 NM and a curve S of a sagittal field curve of the incident light with the wavelength of 587.6000 NM.

In this embodiment, an overall image quality of the photographing lens system 100 may be greatly improved and the imaging range may be expanded. When the electronic zoom is performed, a better image quality and a better close-distance effect may be obtained.

The photographing lens system provided by the embodiments of the present disclosure has been described above in detail. The following is a brief introduction to a photographing device and an electronic apparatus provided by the embodiments of the present disclosure.

As illustrated in FIG. 1, FIG. 5, FIG. 9, FIG. 13 and FIG. 17, an illustrative embodiment of the present disclosure also provides a photographing device, including an image sensor 13 and the photographing lens system 100 described in any of the above embodiments. The image sensor 13 is located at the image plane 131 of the photographing lens system 100, and a surface of the image sensor 13 facing the object side is located at the image plane 131.

In this embodiment, the photographing lens system includes the first lens group and the second lens group in sequence from the object side to the image side, and the first lens group includes N lenses. In the direction from the object side to the image side, the lens one in the first lens group is the first lens, and the lens N in the first lens group is the second lens. The first lens is a lens with a positive focal power, and the surface of the first lens facing the object side is a convex surface. The second lens is a lens with a focal power, and the second lens group includes at least one lens with a focal power. That is, the focal power of the second lens is not zero, and may be positive or negative, and also the focal power of the at least one lens of the second lens group is not zero, and may be positive or negative. Therefore, through the cooperation of the first lens group and the second lens group, the photographing lens system allows an aberration change caused by the first lens group and an aberration change caused by the second lens group to be compensated with each other, in the process of focusing between the infinite distance and the closer distance, so as to maintain a good image resolution ability in the process of focusing between the infinite distance and the closer distance. Moreover, the focal length of the first lens group and the focal length of the photographing lens system satisfy the relationship of f1/f of 0.5<f1/f<1.5. Thus, the balance between the total track length (TTL) and the optical performance may be ensured.

An illustrative embodiment of the present disclosure also provides an electronic apparatus. The electronic apparatus includes an apparatus body and the photographing device according to any of the above embodiments, and the photographing device is mounted to the apparatus body.

In this embodiment, the electronic apparatus may be, but is not limited to, a three-dimensional image capturing device, a digital camera, a mobile terminal, a digital tablet, an intelligent TV, a network monitoring device, a somatosensory game console, a dash cam, a backup camera, a wearable device or an aerial camera.

In this embodiment, the photographing lens system includes the first lens group and the second lens group in sequence from the object side to the image side, and the first lens group includes N lenses. In the direction from the object side to the image side, the lens one in the first lens group is the first lens, and the lens N in the first lens group is the second lens. The first lens is a lens with a positive focal power, and the surface of the first lens facing the object side is a convex surface. The second lens is a lens with a focal power, and the second lens group includes at least one lens with a focal power. Therefore, through the cooperation of the first lens group and the second lens group, the photographing lens system allows an aberration change caused by the first lens group and an aberration change caused by the second lens group to be compensated with each other, in the process of focusing between the infinite distance and the closer distance, so as to maintain a good image resolution ability in the process of focusing between the infinite distance and the closer distance. Moreover, the focal length of the first lens group and the focal length of the photographing lens system satisfy the relationship of f1/f of 0.5<f1/f<1.5. Thus, the balance between the total track length (TTL) and the optical performance may be ensured.

Other embodiments of the present disclosure will be apparent to those skilled in the art after consideration of the specification and practice of the present disclosure disclosed herein. This application is intended to cover any variations, uses, or adaptations of the present disclosure following the general principles of the present disclosure and including such known or customary practice in the art, which is not described in the present disclosure. It is intended that the specification and examples be considered as illustrative only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A photographing lens system, comprising a first lens group and a second lens group in sequence from an object side to an image side, wherein the first lens group comprises N lenses, and N=8; in a direction from the object side to the image side, a first lens in the first lens group is lens one, and a lens which is located most adjacent to the image side in the first lens group is two; the first lens has a positive focal power, a surface of the first lens facing the object side is a convex surface, and the lens two has a focal power;

the second lens group comprises at least one lens with a focal power;

an air gap between the first lens group and the second lens group is changed in a process of focusing between an infinite distance and a closer distance, wherein a focal length of the first lens group is f1, a focal length of the photographing lens system is f when focused at the infinite distance, and the focal length of the first lens group and the focal length of the photographing lens system when focused at the infinite distance satisfy a following relationship of f1/f:

$0.5 < f1/f < 1.5$, wherein a distance on an optical axis between a vertex of the surface of the first lens facing the object side and an image plane is TTL, an effective image height is IH, and the TTL and the IH satisfy a following relationship of TTL/IH:

TTL/IH is equal to 1.73, in the process of focusing from the infinite distance to the closer distance, the first lens group is configured to move towards the object side along an optical axis, so that the air gap between the first lens group and the second lens group when focused at the closer distance is greater than the air gap between the first lens group and the second lens group when focused at the infinite distance.

2. The photographing lens system according to claim 1, wherein in the process of focusing from the infinite distance to the closer distance, a position of the second lens group is fixed.

3. The photographing lens system according to claim 1, wherein in the process of focusing from the infinite distance to the closer distance, the second lens group moves towards the image side along the optical axis.

4. The photographing lens system according to claim 1, wherein in the process of focusing from the infinite distance to the closer distance, the second lens group moves towards the object side along the optical axis.

5. The photographing lens system according to claim 1, wherein a focal length of the first lens is fL1, and the focal length of the first lens and the focal length of the photographing lens system when focused at the infinite distance satisfy a following relationship of fL1/f: $0.5<fL1/f<2.0$.

6. The photographing lens system according to claim 5, wherein an abbe number of the first lens is Vd1, a refractive index of the first lens is Nd1, and the abbe number of the first lens and the refractive index of the first lens satisfy a following relationship of Vd1/Nd1:

$30.0<Vd1/Nd1<40.0$.

7. The photographing lens system according to claim 1, wherein a variation of the air gap between the first lens group and the second lens group is d, and the variation of the air gap and the focal length of the first lens group satisfy a following relationship of d/f1:

$0<d/f1<0.5$, the variation of the air gap is an absolute value of a difference of the air gap between the first lens group and the second lens group when focused at the infinite distance and the air gap between the first lens group and the second lens group when focused at the closer distance.

8. The photographing lens system according to claim 1, wherein a focal length of the lens two is fL2, a focal length of the second lens group is f2, and the focal length of the lens two and the focal length of the second lens group satisfy a following relationship of fL2/f2:

$|fL2/f2|<5.0$.

9. The photographing lens system according to claim 1, wherein a distance on an optical axis between a vertex of the surface of the first lens facing the object side and an image plane is TTL, and the distance on the optical axis between the vertex of the surface of the first lens facing the object side and the image plane and the focal length of the photographing lens system when focused at the infinite distance satisfy a following relationship of TTL/f:

$1.0<TTL/f<5.0$.

10. A photographing device, comprising an image sensor and a photographing lens system, the image sensor being arranged at an image plane of the photographing lens system, the photographing lens system comprising a first lens group and a second lens group in sequence from an object side to an image side,
wherein the first lens group comprises N lenses, and N=8;
in a direction from the object side to the image side, a first lens in the first lens group is lens one, and a lens which is located most adjacent to the image side in the first lens group is lens two; the first lens has a positive focal power, a surface of the first lens facing the object side is a convex surface, and the lens two has a focal power;
the second lens group comprises at least one lens with a focal power;
an air gap between the first lens group and the second lens group is changed in a process of focusing between an infinite distance and a closer distance,
wherein a focal length of the first lens group is f1, a focal length of the photographing lens system is f when focused at the infinite distance, and the focal length of the first lens group and the focal length of the photographing lens system when focused at the infinite distance satisfy a following relationship of f1/f:

$0.05<f1/f<1.5$, wherein a distance on an optical axis between a vertex of the surface of the first lens facing the object side and the image plane is TTL, an effective image height is IH, and the distance on the optical axis between the vertex of the surface of the first lens facing the object side and the image plane and the effective image height satisfy a following relationship of TTL/IH:
TTL/IH is equal to 1.73,
in the process of focusing from the infinite distance to the closer distance, the first lens group is configured to move towards the object side along an optical axis, so that the air gap between the first lens group and the second lens group when focused at the closer distance is greater than the air gap between the first lens group and the second lens group when focused at the infinite distance.

11. The photographing device according to claim 10, wherein in the process of focusing from the infinite distance to the closer distance, a position of the second lens group is fixed.

12. The photographing device according to claim 10, wherein in the process of focusing from the infinite distance to the closer distance, the second lens group moves towards the image side along the optical axis.

13. The photographing device according to claim 10, wherein in the process of focusing from the infinite distance to the closer distance, the second lens group moves towards the object side along the optical axis.

14. The photographing device according to claim 10, wherein a focal length of the first lens is fL1, and the focal length of the first lens and the focal length of the photographing lens system when focused at the infinite distance satisfy a following relationship of fL1/f:

$0.5<fL1/f<2.0$.

15. The photographing device according to claim 10, wherein a variation of the air gap between the first lens group and the second lens group is d, and the variation of the air gap and the focal length of the first lens group satisfy a following relationship of d/f1:

$0.5<d/f1<0.5$, the variation of the air gap is an absolute value of a difference of the air gap between the first lens group and the second lens group when focused at the infinite distance and the air gap between the first lens group and the second lens group when focused at the closer distance.

16. The photographing device according to claim 10, wherein a focal length of the lens two is fL2, a focal length of the second lens group is f2, and the focal length of the lens two and the focal length of the second lens group satisfy a following relationship of fL2/f2:

$$|fL2/f2|<5.0.$$

17. The photographing device according to claim 10, wherein a distance on an optical axis between a vertex of the surface of the first lens facing the object side and the image plane is TTL, and the distance on the optical axis between the vertex of the surface of the first lens facing the object side and the image plane and the focal length of the photographing lens system when focused at the infinite distance satisfy a following relationship of TTL/f:

$$1.0<TTL/f<5.0.$$

18. An electronic apparatus, comprising an apparatus body and a photographing device, the photographing device being mounted to the apparatus body, the photographing device comprising an image sensor and a photographing lens system, the image sensor being arranged at an image plane of the photographing lens system, the photographing lens system comprising a first lens group and a second lens group in sequence from an object side to an image side, wherein the first lens group comprises N lenses, and N=8; in a direction from the object side to the image side, a first lens in the first lens group is lens one, and a lens which is located most adjacent to the image side in the first lens group is lens two; the first lens has a positive focal power, a surface of the first lens facing the object side is a convex surface, and the lens two has a focal power;

the second lens group comprises at least one lens with a focal power;

an air gap between the first lens group and the second lens group is changed in a process of focusing between an infinite distance and a closer distance, wherein a focal length of the first lens group is f1, a focal length of the photographing lens system is f when focused at the infinite distance, and the focal length of the first lens group and the focal length of the photographing lens system when focused at the infinite distance satisfy a following relationship of f1/f:

$$0.5<f1/f<1.5,$$

wherein a distance on an optical axis between a vertex of the surface of the first lens facing the object side and an image plane is TTL, an effective image height is IH, and the TTL and the IH satisfy a following relationship of TTL/IH: TTL/IH is equal to 1.73, in the process of focusing from the infinite distance to the closer distance, the first lens group is configured to move towards the object side along an optical axis, so that the air gap between the first lens group and the second lens group when focused at the closer distance is greater than the air gap between the first lens group and the second lens group when focused at the infinite distance.

* * * * *